(12) United States Patent
Li et al.

(10) Patent No.: US 10,203,906 B2
(45) Date of Patent: Feb. 12, 2019

(54) DATA BACKUP APPARATUS AND METHOD

(71) Applicant: HUAWEI TECHNOLOGIES CO., LTD., Shenzhen, Guangdong (CN)

(72) Inventors: Hehe Li, Beijing (CN); Yongpan Liu, Beijing (CN); Qinghang Zhao, Beijing (CN); Rong Luo, Beijing (CN); Huazhong Yang, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/696,183

(22) Filed: Sep. 6, 2017

(65) Prior Publication Data

US 2018/0074716 A1  Mar. 15, 2018

Related U.S. Application Data

(63) Continuation of application No. PCT/CN2016/075290, filed on Mar. 2, 2016.

(30) Foreign Application Priority Data

Mar. 6, 2015 (CN) .......................... 2015 1 0100395
Feb. 23, 2016 (CN) .......................... 2016 1 0099237

(51) Int. Cl.
*G06F 12/00* (2006.01)
*G06F 13/00* (2006.01)
(Continued)

(52) U.S. Cl.
CPC .............. *G06F 3/065* (2013.01); *G06F 3/061* (2013.01); *G06F 3/0619* (2013.01);
(Continued)

(58) Field of Classification Search
CPC ........................ G06F 11/1441; G06F 11/2015
See application file for complete search history.

(56) References Cited

U.S. PATENT DOCUMENTS 8,464,002 B2 *  6/2013  Burger ................ G06F 12/0879
                                                                 711/133
2008/0104344 A1   5/2008  Shimozono et al.
(Continued)

FOREIGN PATENT DOCUMENTS

CN       101960430 A      1/2011
CN       103049070 A      4/2013
(Continued)

OTHER PUBLICATIONS

Pan Xiang et al:"NVSleep:Using non-volatile memory to enable fast sleep/wakeup of idle cores" ,2014 IEEE 32nd International Conference on Computer Design(ICCD),IEEE,Oct. 19, 2014, XP032695588 ,8 pages.
(Continued)

*Primary Examiner* — Sean D Rossiter
(74) *Attorney, Agent, or Firm* — Womble Bond Dickinson (US) LLP

(57) ABSTRACT

When a data backup apparatus is powered on, a quantity of dead blocks and a quantity of live blocks are counted. After the data backup apparatus is powered off, a proportion occupied by dead blocks corresponding to each sequence access identifier at the power-on time point in a total quantity of sampled cache blocks corresponding to the sequence access identifier, is calculated according to the counted quantities of dead blocks and live blocks that correspond to the sequence access identifier at the time point when the data backup apparatus is powered on. The calculated proportion is compared with a preset threshold, and a dead block in a volatile memory unit is predicted according to a comparison result. During backup, a cache block that is predicted to be a dead block is not backed up.

24 Claims, 10 Drawing Sheets

(51) Int. Cl.
  *G06F 3/06*    (2006.01)
  *G06F 12/128*  (2016.01)
  *G06F 12/08*   (2016.01)
  *G06F 11/14*   (2006.01)
  *G06F 11/30*   (2006.01)
  *G06F 11/20*   (2006.01)

(52) U.S. Cl.
  CPC .......... *G06F 3/0665* (2013.01); *G06F 3/0688* (2013.01); *G06F 11/1441* (2013.01); *G06F 11/3037* (2013.01); *G06F 12/08* (2013.01); *G06F 12/128* (2013.01); *G06F 11/2015* (2013.01); *G06F 2201/88* (2013.01); *G06F 2201/885* (2013.01); *G06F 2212/621* (2013.01)

(56) References Cited

U.S. PATENT DOCUMENTS

| | | | |
|---|---|---|---|
| 2009/0063776 A1 | 3/2009 | Williams | |
| 2011/0087845 A1* | 4/2011 | Burger | G06F 12/0879 711/136 |
| 2014/0351524 A1* | 11/2014 | Natarajan | G06F 12/0891 711/130 |
| 2014/0359237 A1* | 12/2014 | Sartore | G06F 12/0638 711/162 |
| 2015/0012693 A1* | 1/2015 | Amit | G06F 3/064 711/104 |
| 2016/0085677 A1* | 3/2016 | Loh | G06F 12/0815 711/143 |
| 2016/0253265 A1* | 9/2016 | Rapoport | G06F 3/0649 711/135 |
| 2018/0081587 A1* | 3/2018 | Tang | G06F 3/0652 |

FOREIGN PATENT DOCUMENTS

| | | |
|---|---|---|
| CN | 103092774 A | 5/2013 |
| CN | 103135735 A | 6/2013 |
| CN | 103678178 A | 3/2014 |
| EP | 1705574 A2 | 9/2006 |
| JP | 2008108026 A | 5/2008 |
| JP | 2010538390 A | 12/2010 |
| WO | 2013132370 A1 | 9/2013 |
| WO | 2014143053 A1 | 9/2014 |

OTHER PUBLICATIONS

Hehe Li et al. "An Energy Efficient Backup Scheme with Low Inrush Current for Nonvolatile SRAM in Energy Harvesting Sensor Nodes", Design, Automation and Test in Europe Conference and Exhibition (DATE). EDAA 2015. pp. 7-12.

Yiqun Wang et al. A Compression-based Area-efficient Recovery Architecture for Nonvolatile Processors, DATE'12, Mar. 12-16, 2012. total 6 pages.

Xiao Sheng et al. SPaC: A Segment-based Parallel Compression for Backup Acceleration in Nonvolatile Processors, DATE'13, Mar. 18-22, 2013. total 4 pages.

Hsiang-Jen Tsai et al. Leveraging Data Lifetime for Energy-Aware Last Level Non-Volatile SRAM Caches using Redundant Store Elimination, DAC ''14, Jun. 1-5, 2014. total 6 pages.

An-Chow Lai et al. Dead-Block Prediction and Dead-Block Correlating Prefetchers, IEEE. 2001. pp. 144-154.

Mazen Kharbutli et al. Counter-Based Cache Replacement and Bypassing Algorithms, IEEE Transactions on Computers, vol. 57, No. 4, Apr. 2008. pp. 433-447.

Zhigang Hu et al. Timekeeping in the Memory System: Predicting and Optimizing Memory Behavior, Proceedings of the 29th Annual International Symposium on Computer Architecture (ISCA'02). IEEE 2002. total 12 pages.

* cited by examiner

|  1st way  |  2nd way  |  3rd way  |  4th way  |
|:---:|:---:|:---:|:---:|
| 0 | 1 | 2 | 3 |
| 1 | 2 | 3 | 0 |
| 3 | 0 | 1 | 2 |
| 2 | 3 | 0 | 1 |
| ... | ... | ... | ... |
| 3 | 0 | 2 | 1 |

FIG. 2

DATA BACKUP APPARATUS AND METHOD

CROSS-REFERENCE TO RELATED APPLICATIONS

This application is a continuation of International Application No. PCT/CN2016/075290, filed on Mar. 2, 2016, which claims priority to Chinese Patent Application No. 201510100395.7, filed on Mar. 6, 2015, and Chinese Patent Application No. 201610099237.9, filed on Feb. 23, 2016. All of the aforementioned patent applications are hereby incorporated by reference in their entireties.

STATEMENT OF JOINT RESEARCH AGREEMENT

The subject matter and the claimed invention were made by or on the behalf of Tsinghua University, of Beijing, P. R. China and Huawei Technologies Co., Ltd., of Shenzhen, Guangdong Province, P. R. China, under a joint research agreement titled "Method of Partial Backup for the Nonvolatile SRAM". The joint research agreement was in effect on or before the claimed invention was made, and that the claimed invention was made as a result of activities undertaken within the scope of the joint research agreement.

TECHNICAL FIELD

The present disclosure relates to the field of data backup technologies, and in particular, to a memory data backup apparatus and method.

BACKGROUND

In recent years, with development of large multi-core computing systems such as multi-core Graphic Processing Units (GPUs), demands for high-density and high-performance on-chip caches are increasing. Because of a relatively high leakage current and a relatively low integration degree, conventional caching structures based on a static random access memory (SRAM) have become a bottleneck limiting development of high-performance processing systems. In contrast, a new-type nonvolatile memory (NVM), that stores data by using component resistance changes, can, theoretically, achieve a higher integration degree and an extremely low leakage current, and therefore is deemed as an ideal device for substituting conventional SRAMs.

However, if the NVM is directly used as a caching device, problems of write power consumption, write latency, and write endurance may occur, which limit applications of the NVM in high-speed caches. A nonvolatile SRAM is a memory structure that includes both a SRAM and an NVM. It uses the SRAM to store data in a working mode, and can back up data to the NVM at a power outage. However, after a power outage, the nonvolatile SRAM needs a relatively large on-chip energy storage capacitor to supply power for backing up data, and this kind of capacitors may require relatively high chip area overheads and cost overheads. In addition, as the storage capacity increases, by a high peak current may be generated in a parallel backup process, which reduces system stability. On the other hand, a backup time in a serial backup increases as the backup data volume grows, affecting system performance and causing relatively high data redundancy in the backup process.

An existing backup method using a segment-based parallel compression (SPaC) architecture, is shown in FIG. 1. Data in a SRAM is divided into multiple segments, then a compression module compresses each segment of data by means of run-length encoding, and then compressed data is stored into an NVM unit. In this compression backup method, all data in the SRAM is compressed, and therefore there is a relatively high degree of data redundancy. In addition, when this method is used, compression and decompression operations are required respectively before data backup and before data recovery. Therefore, as a data volume grows larger, a longer compression and decompression time is needed, which affects system performance.

SUMMARY

Embodiments of the present disclosure provide a data backup apparatus and a method to reduce backup data volume and improve backup efficiency.

A first aspect of the embodiments of the present disclosure provides a data backup apparatus, where the data backup apparatus includes a memory and a processor, and the memory includes a volatile memory unit, a nonvolatile memory unit, a microprocessor, and a backup power supply;

the volatile memory unit includes M cache block sets, each cache block set includes N cache blocks, $M \geq 1$, $N > 1$, each cache block set uses a same group of N access sequence identifiers to indicate a sequence that a cache block is accessed in a cache block set, an access sequence identifier of each cache block is updated with a change of the sequence that a cache block is accessed in a cache block set, each cache block is further configured with a state identifier, and each state identifier is used to identify whether a cache block is sampled;

the data backup apparatus further includes a counting unit, where the counting unit includes N counter groups, each counter group includes one first counter and one second counter, and the N counter groups are in a one-to-one correspondence with the N access sequence identifiers;

after the data backup apparatus is powered on, the processor is configured to: recover data backed up in the nonvolatile memory unit to the volatile memory unit, obtain and record an initial access sequence identifier of each cache block in each cache block set at a time point $T_0$, and set a state identifier of each cache block in the volatile memory unit to that the cache block is not sampled, where the time point $T_0$ is a time point at which the data backup apparatus is powered on; and the processor is further configured to: perform a data operation on the volatile memory unit; when a state identifier of a cache block corresponding to the current data operation is that the cache block is not sampled and the cache block corresponding to the data operation is accessed, determine that the cache block corresponding to the current data operation is in a live state, and perform counting on a first counter corresponding to the initial access sequence identifier of the cache block corresponding to the current data operation at the time point $T_0$, or when a state identifier of a cache block corresponding to the current data operation is that the cache block is not sampled and the cache block corresponding to the data operation is evicted, determine that the cache block corresponding to the current data operation is in a dead state, and perform counting on a second counter corresponding to the initial access sequence identifier of the cache block corresponding to the current data operation at the time point $T_0$; and after any counting on a counter, change the state identifier of the cache block corresponding to the current data operation to that the cache block is sampled; and after the data backup apparatus is powered off, the microprocessor is configured to: start the backup power supply to power the memory; read counts of the N counter groups; calculate a ratio of a count of a second counter in a counter group corresponding to each initial access sequence identifier at the time point $T_0$ to a sum of a first counter and the second counter that are in the counter group corresponding to the initial access sequence identifier at the time point $T_0$; compare a ratio corresponding to each initial access sequence identifier at the time point $T_0$ with a preset threshold; predict, according to a comparison result corresponding to each initial access sequence identifier at the time point $T_0$, whether a cache block in the nonvolatile memory unit is to be in the live state or the dead state at a time point $T_1$; and back up data of a cache block that is predicted to be in the live state to the nonvolatile memory unit, where the time point $T_1$ is a time point at which the data backup apparatus is powered off.

The predicting, according to a comparison result corresponding to each initial access sequence identifier at the time point $T_0$, whether a cache block in the nonvolatile memory unit is to be in the live state or the dead state at a time point $T_1$ includes:

when a comparison result corresponding to an access sequence identifier of the N initial access sequence identifiers that are at the time point $T_0$ is not less than the preset threshold, predicting, by the microprocessor, that a cache block having the access sequence identifier is to be in the dead state; or when a comparison result corresponding to an access sequence identifier of the N initial access sequence identifiers that are at the time point $T_0$ is not greater than the preset threshold, predicting, by the microprocessor, that a cache block having the access sequence identifier is to be in the live state.

Further, according to the first aspect of the embodiments of the present disclosure, each cache block further includes a valid block identifier and a dirty block identifier, the valid block identifier is used to identify whether the cache block is valid, and the dirty block identifier is used to identify whether the cache block is a dirty block;

after predicting that a cache block having the access sequence identifier is to be in the dead state, the microprocessor further determines that, among cache blocks that have the access sequence identifier and that are predicted to be in the dead state, a cache block whose dirty block identifier is valid is to be in the live state; and after predicting that a cache block having the access sequence identifier is to be in the live state, the microprocessor further determines that, among cache blocks that have the access sequence identifier and that are predicted to be in the live state, a cache block whose validity identifier is invalid is to be in the dead state.

Further, according to the first aspect of the embodiments of the present disclosure, the backing up, by the microprocessor, data of a cache block that is predicted to be in the live state to the nonvolatile memory unit includes: recording, by the microprocessor, information about a cache block that is predicted to be in the dead state to a dead cache block recording table; determining, according to the information that is about the cache block predicted to be in the dead state and that is recorded in the dead cache block recording table, whether a current to-be-backed-up cache block is a cache block that is predicted to be in the dead state or a cache block that is predicted to be in the live state; and if the current to-be-backed-up cache block is a cache block that is predicted to be in the live state, backing up data in the current to-be-backed-up cache block, or if the current to-be-backed-up cache block is a cache block that is predicted to be in the dead state, skipping backing up data in the current to-be-backed-up cache block.

Further, according to the first aspect of the embodiments of the present disclosure, the preset threshold is 0.5.

A second aspect of the embodiments of the present disclosure provides a data backup apparatus, where the data backup apparatus includes a memory and a processor, and the memory includes a volatile memory unit, a nonvolatile memory unit, a microprocessor, and a backup power supply;

the volatile memory unit includes M cache block sets, each cache block set includes N cache blocks, M≥1, N>1, each cache block set uses a same group of N access sequence identifiers to indicate a sequence that a cache block is accessed in a cache block set, an access sequence identifier of each cache block is updated with a change of the sequence that a cache block is accessed in a cache block set, each cache block is further configured with a state identifier, and each state identifier is used to identify whether a cache block is sampled;

the data backup apparatus further includes a counting unit, where the counting unit includes N counter groups, each counter group includes one first counter and one second counter, and the N counter groups are in a one-to-one correspondence with the N access sequence identifiers;

after the data backup apparatus is powered on, the processor is configured to: recover data backed up in the nonvolatile memory unit to the volatile memory unit, obtain and record an initial access sequence identifier of each cache block in each cache block set at a time point $T_0$, and set a state identifier of each cache block in the volatile memory unit to that the cache block is not sampled, where the time point $T_0$ is a time point at which the data backup apparatus is powered on; and the processor is further configured to: perform a data operation on the volatile memory unit; when a state identifier of a cache block corresponding to the current data operation is that the cache block is not sampled and the cache block corresponding to the data operation is accessed, determine that the cache block corresponding to the current data operation is in a live state, and perform counting on a first counter corresponding to the initial access sequence identifier of the cache block corresponding to the current data operation at the time point $T_0$, or when a state identifier of a cache block corresponding to the current data operation is that the cache block is not sampled and the cache block corresponding to the data operation is evicted, determine that the cache block corresponding to the current data operation is in a dead state, and perform counting on a second counter corresponding to the initial access sequence identifier of the cache block corresponding to the current data operation at the time point $T_0$; and after any counting on a counter, change the state identifier of the cache block corresponding to the current data operation to that the cache block is sampled; and after the data backup apparatus is powered off, the microprocessor is configured to: start the backup power supply to power the memory; read counts of the N counter groups; calculate a ratio of a count of a second counter in a counter group corresponding to each initial access sequence identifier at the time point $T_0$ to a sum of a first counter and the second counter that are in the counter group corresponding to the initial access sequence identifier at the time point $T_0$; determine, according to ratios respectively corresponding to the N initial access sequence identifiers that are at the time point $T_0$, a corresponding access sequence identifier threshold when the ratio is 1 to 2; compare each initial access sequence identifier at the time point $T_0$ with the access sequence identifier threshold; predict, according to a comparison result corresponding to each initial access sequence identifier at the time point $T_0$, whether a cache block in the nonvolatile memory unit is to be in the live state or the dead state at a time point $T_1$; and back up data of a cache block that is predicted to be in the live state to the nonvolatile memory unit, where the time point $T_1$ is a time point at which the data backup apparatus is powered off.

Further, according to the second aspect of the embodiments of the present disclosure, the predicting, according to a comparison result corresponding to each initial access sequence identifier at the time point $T_0$, whether a cache block in the nonvolatile memory unit is to be in the live state or the dead state at a time point $T_1$ includes:
  when a comparison result corresponding to an access sequence identifier of the N initial access sequence identifiers that are at the time point $T_0$ is not less than the access sequence identifier threshold, predicting, by the microprocessor, that a cache block having the access sequence identifier is to be in the dead state; or
  when a comparison result corresponding to an access sequence identifier of the N initial access sequence identifiers that are at the time point $T_0$ is not greater than the access sequence identifier threshold, predicting, by the microprocessor, that a cache block having the access sequence identifier is to be in the live state.

Further, according to the second aspect of the embodiments of the present disclosure, each cache block further includes a valid block identifier and a dirty block identifier, the valid block identifier is used to identify whether the cache block is valid, and the dirty block identifier is used to identify whether the cache block is a dirty block; and after predicting that a cache block having the access sequence identifier is to be in the dead state, the microprocessor further determines that, among cache blocks that have the access sequence identifier and that are predicted to be in the dead state, a cache block whose dirty block identifier is valid is to be in the live state; and
  after predicting that a cache block having the access sequence identifier is to be in the live state, the microprocessor further determines that, among cache blocks that have the access sequence identifier and that are predicted to be in the live state, a cache block whose validity identifier is invalid is to be in the dead state.

Further, according to the second aspect of the embodiments of the present disclosure, the backing up, by the microprocessor, data of a cache block that is predicted to be in the live state to the nonvolatile memory unit includes:
recording, by the microprocessor, information about a cache block that is predicted to be in the dead state to a dead cache block recording table; determining, according to the information that is about the cache block predicted to be in the dead state and that is recorded in the dead cache block recording table, whether a current to-be-backed-up cache block is a cache block that is predicted to be in the dead state or a cache block that is predicted to be in the live state; and if the current to-be-backed-up cache block is a cache block that is predicted to be in the live state, backing up data in the current to-be-backed-up cache block, or if the current to-be-backed-up cache block is a cache block that is predicted to be in the dead state, skipping backing up data in the current to-be-backed-up cache block.

A third aspect of the embodiments of the present disclosure provides a data backup apparatus, where the data backup apparatus includes a memory and a processor, and the memory includes a volatile memory unit, a nonvolatile memory unit, a microprocessor, and a backup power supply;
  the volatile memory unit includes M cache block sets, each cache block set includes N cache blocks, $M \geq 1$, $N > 1$, each cache block set uses a same group of N access sequence identifiers to indicate a sequence that a cache block is accessed in a cache block set, an access sequence identifier of each cache block is updated with a change of the sequence that a cache block is accessed in a cache block set, and each cache block includes a recently used bit RUB and a state bit, where the recently used bit RUB is used to store an access sequence identifier of the cache block, the state bit stores a state identifier, and the state identifier identifies whether the cache block is sampled;
  the memory further includes:
  a first addressing device and a second addressing device, where input ends of the first addressing device and the second addressing device are both connected to each cache block; and
  a counting unit, where the counting unit includes N counter groups, the N counter groups are in a one-to-one correspondence with the N access sequence identifiers, each counter group includes one first counter and one second counter, an input end of the first counter is connected to an output end of the first addressing device, and an input end of the second counter is connected to an output end of the second addressing device;
  after the data backup apparatus is powered on,
  the processor is configured to: recover data backed up in the nonvolatile memory unit to the volatile memory unit, obtain an initial access sequence identifier of each cache block in each cache block set at a time point $T_0$ and record the initial access sequence identifier to a recently used bit RUB of the cache block, and set a state bit of each cache block in the volatile memory unit to invalid, where the time point $T_0$ is a time point at which the data backup apparatus is powered on;
  the processor is further configured to perform a data operation on the volatile memory unit, where when determining that a state identifier of a cache block corresponding to the current data operation is that the cache block is not sampled and that the cache block corresponding to the data operation is accessed, the processor determines that the cache block corresponding to the current data operation is in a live state, and then controls the first addressing device to find the corresponding cache block according to an address of the cache block corresponding to the current data operation, obtain an access sequence identifier of the found cache block at the time point $T_0$, obtain, according to the obtained access sequence identifier at the time point $T_0$, a first counter corresponding to the sequence access sequence identifier at the time point $T_0$, and perform counting on the first counter, and the processor changes the state identifier of the cache block to that the cache block is sampled; or when determining that a state identifier of a cache block corresponding to the current data operation is that the cache block is not sampled and that the cache block corresponding to the data operation is evicted, determines that the cache block corresponding to the current data operation is in a dead state, the second addressing device finds the corresponding cache block according to an address of the cache block corresponding to the current data operation, obtains an access sequence identifier of the found cache block at the time point $T_0$, obtains, according to the obtained access sequence identifier at the time point $T_0$, a second counter corresponding to the sequence access identifier at the time point $T_0$, and performs counting on the second counter, and the processor changes the state identifier of the cache block to that the cache block is sampled;

the memory further includes:

N shifters, respectively connected to output ends of first counters in the N counter groups; and N comparators, where each comparator has two input ends, which are respectively connected to an output end of a second counter in a counter group and an output end of a shifter connected to a first counter in the counter group; and after the data backup apparatus is powered off, the microprocessor is configured to start the backup power supply to power the memory, each shifter shifts, according to a preset threshold, a first counter connected to the shifter, each comparator compares an input from a second counter connected to the comparator and an input from a shifter connected to the comparator, the microprocessor predicts, according to an output result of a comparator corresponding to each access sequence identifier, whether each cache block in the nonvolatile memory unit is to be in the live state or the dead state at a time point $T_1$, and backs up data in a cache block that is predicted to be in the live state to the nonvolatile memory unit, where the time point $T_1$ is a time point at which the data backup apparatus is powered off.

In the third aspect of the embodiments of the present disclosure, the first addressing device includes a first data selector and a first decoder, the second addressing device includes a second data selector and a second decoder, input ends of the first data selector and the second data selector are both connected to each cache block, input ends of the first decoder and the second decoder are respectively connected to output ends of the first data selector and the second data selector, output ends of the first decoder and the second decoder are respectively connected to an input end of a first counter in each counter group and an input end of a second counter group in the counter group; and when the processor determines that the cache block corresponding to the current data operation is in the live state, the first data selector finds the corresponding cache block according to the address of the cache block corresponding to the current data operation, and obtains the access sequence identifier of the found cache block at the time point $T_0$, and the first decoder decodes the obtained access sequence identifier to obtain a first counter corresponding to the sequence access identifier; or when the processor determines that the cache block corresponding to the current data operation is in the dead state, the second data selector finds the corresponding cache block according to the address of the cache block corresponding to the current data operation, and obtains the access sequence identifier of the found cache block at the time point $T_0$, and the second decoder decodes the obtained access sequence identifier at the time point $T_0$ to obtain a second counter corresponding to the sequence access identifier, and then performs counting on the second counter.

A fourth aspect of the embodiments of the present disclosure provides a data backup method applied to a data backup apparatus, where the data backup apparatus includes a memory, and the memory includes a volatile memory unit, a nonvolatile memory unit, and a backup power supply;

the volatile memory unit includes M cache block sets, each cache block set includes N cache blocks, $M \geq 1$, $N > 1$, each cache block set uses a same group of N access sequence identifiers to indicate a sequence that a cache block is accessed in a cache block set, an access sequence identifier of each cache block is updated with a change of the sequence that a cache block is accessed in a cache block set, each cache block is further configured with a state identifier, and each state identifier is used to identify whether a cache block is sampled;

the data backup apparatus further includes a counting unit, where the counting unit includes N counter groups, each counter group includes one first counter and one second counter, and the N counter groups are in a one-to-one correspondence with the N access sequence identifiers; and the method includes:

after the data backup apparatus is powered on, recovering data backed up in the nonvolatile memory unit to the volatile memory unit, obtaining and recording an initial access sequence identifier of each cache block in each cache block set at a time point $T_0$, and setting a state identifier of each cache block in the volatile memory unit to that the cache block is not sampled, where the time point $T_0$ is a time point at which the data backup apparatus is powered on; and performing a data operation on the volatile memory unit; when a state identifier of a cache block corresponding to the current data operation is that the cache block is not sampled and the cache block corresponding to the data operation is accessed, determining that the cache block corresponding to the current data operation is in a live state, performing counting on a first counter corresponding to the initial access sequence identifier of the cache block corresponding to the current data operation at the time point $T_0$, and updating the state identifier of the cache block corresponding to the current data operation to that the cache block is sampled; or when a state identifier of a cache block corresponding to the current data operation is that the cache block is not sampled and the cache block corresponding to the data operation is evicted, determining that the cache block corresponding to the current data operation is in a dead state, performing counting on a second counter corresponding to the initial access sequence identifier of the cache block corresponding to the current data operation at the time point $T_0$, and updating the state identifier of the cache block corresponding to the current data operation to that the cache block is sampled; and after the data backup apparatus is powered off, starting the backup power supply to power the memory;

reading counts of the N counter groups, and calculating a ratio of a count of a second counter in a counter group corresponding to each initial access sequence identifier at the time point $T_0$ to a sum of a first counter and the second counter that are in the counter group corresponding to the initial access sequence identifier at the time point $T_0$;

comparing a ratio corresponding to each initial access sequence identifier at the time point $T_0$ with a preset threshold, and predicting, according to a comparison result corresponding to each initial access sequence identifier at the time point $T_0$, whether a cache block in the nonvolatile memory unit is to be in the live state or the dead state, where the time point $T_1$ is a time point at which the data backup apparatus is powered off; and backing up data of a cache block that is predicted to be in the live state to the nonvolatile memory unit.

Further, according to the fourth aspect of the embodiments of the present disclosure, the predicting, according to a comparison result corresponding to each initial access sequence identifier at the time point $T_0$, whether a cache block in the nonvolatile memory unit is to be in the live state or the dead state at a time point $T_1$ includes:

when a comparison result corresponding to an access sequence identifier of the N initial access sequence identifiers that are at the time point $T_0$ is not less than the preset threshold, predicting that a cache block having the access sequence identifier is to be in the dead state; or when a comparison result corresponding to an access sequence identifier of the N initial access sequence identifiers that are at the time point $T_0$ is not greater than the preset threshold, predicting that a cache block having the access sequence identifier is to be in the live state.

Further, according to the fourth aspect of the embodiments of the present disclosure, each cache block further includes a valid block identifier and a dirty block identifier, the valid block identifier is used to identify whether the cache block is valid, and the dirty block identifier is used to identify whether the cache block is a dirty block;

after the predicting that a cache block having the access sequence identifier is to be in the dead state, among cache blocks that have the access sequence identifier and that are predicted to be in the dead state, that a cache block whose dirty block identifier is valid is to be in the live state is further determined; and after the predicting that a cache block having the access sequence identifier is to be in the live state, among cache blocks that have the access sequence identifier and that are predicted to be in the live state, that a cache block whose validity identifier is invalid is to be in the dead state is further determined.

Further, according to the fourth aspect of the embodiments of the present disclosure, the backing up data of a cache block that is predicted to be in the live state to the nonvolatile memory unit includes:

recording information about a cache block that is predicted to be in the dead state to a dead cache block recording table; and determining, according to the information that is about the cache block predicted to be in the dead state and that is recorded in the dead cache block recording table, whether a current to-be-backed-up cache block is a cache block that is predicted to be in the dead state or a cache block that is predicted to be in the live state; and if the current to-be-backed-up cache block is a cache block that is predicted to be in the live state, backing up data in the current to-be-backed-up cache block; or if the current to-be-backed-up cache block is a cache block that is predicted to be in the dead state, skipping backing up data in the current to-be-backed-up cache block.

Further, according to the fourth aspect of the embodiments of the present disclosure, the preset threshold is 0.5.

A fifth aspect of the embodiments of the present disclosure provides a data backup method applied to a data backup apparatus, where the data backup apparatus includes a memory, and the memory includes a volatile memory unit, a nonvolatile memory unit, and a backup power supply;

the volatile memory unit includes M cache block sets, each cache block set includes N cache blocks, $M \geq 1$, $N > 1$, each cache block set uses a same group of N access sequence identifiers to indicate a sequence that a cache block is accessed in a cache block set, an access sequence identifier of each cache block is updated with a change of the sequence that a cache block is accessed in a cache block set, each cache block is further configured with a state identifier, and each state identifier is used to identify whether a cache block is sampled;

the data backup apparatus further includes a counting unit, where the counting unit includes N counter groups, each counter group includes one first counter and one second counter, and the N counter groups are in a one-to-one correspondence with the N access sequence identifiers; and the method includes:

after the data backup apparatus is powered on, recovering data backed up in the nonvolatile memory unit to the volatile memory unit, obtaining and recording an initial access sequence identifier of each cache block in each cache block set at a time point $T_0$, and setting a state identifier of each cache block in the volatile memory unit to that the cache block is not sampled, where the time point $T_0$ is a time point at which the data backup apparatus is powered on; and performing a data operation on the volatile memory unit; when a state identifier of a cache block corresponding to the current data operation is that the cache block is not sampled and the cache block corresponding to the data operation is accessed, determining that the cache block corresponding to the current data operation is in a live state, performing counting on a first counter corresponding to the initial access sequence identifier of the cache block corresponding to the current data operation at the time point $T_0$, and updating the state identifier of the cache block corresponding to the current data operation to that the cache block is sampled; or when a state identifier of a cache block corresponding to the current data operation is that the cache block is not sampled and the cache block corresponding to the data operation is evicted, determining that the cache block corresponding to the current data operation is in a dead state, performing counting on a second counter corresponding to the initial access sequence identifier of the cache block corresponding to the current data operation at the time point $T_0$, and updating the state identifier of the cache block corresponding to the current data operation to that the cache block is sampled; and after the data backup apparatus is powered off, starting the backup power supply to power the memory; reading counts of the N counter groups, and calculating a ratio of a count of a second counter in a counter group corresponding to each initial access sequence identifier at the time point $T_0$ to a sum of a first counter and the second counter that are in the counter group corresponding to the initial access sequence identifier at the time point $T_0$;

determining, according to ratios respectively corresponding to the N initial access sequence identifiers that are at the time point $T_0$, a corresponding access sequence identifier threshold when the ratio is 1 to 2; and comparing each initial access sequence identifier at the time point $T_0$ with the access sequence identifier threshold;

predicting, according to a comparison result corresponding to each initial access sequence identifier at the time point $T_0$, whether a cache block in the nonvolatile memory unit is to be in the live state or the dead state, where the time point $T_1$ is a time point at which the data backup apparatus is powered off; and backing up data of a cache block that is predicted to be in the live state to the nonvolatile memory unit.

Further, according to the fifth aspect of the embodiments of the present disclosure, the predicting, according to a comparison result corresponding to each initial access sequence identifier at the time point $T_0$, whether a cache block in the nonvolatile memory unit is to be in the live state or the dead state at a time point $T_1$ includes:

when a comparison result corresponding to an access sequence identifier of the N initial access sequence identifiers that are at the time point $T_0$ is not less than the access sequence identifier threshold, predicting that a cache block having the access sequence identifier is to be in the dead state; or when a comparison result corresponding to an access sequence identifier of the N initial access sequence identifiers that are at the time point $T_0$ is not greater than the access sequence identifier threshold, predicting that a cache block having the access sequence identifier is to be in the live state.

Further, according to the fifth aspect of the embodiments of the present disclosure, each cache block further includes a valid block identifier and a dirty block identifier, the valid block identifier is used to identify whether the cache block is valid, and the dirty block identifier is used to identify whether the cache block is a dirty block;

after the predicting that a cache block having the access sequence identifier is to be in the dead state, among cache blocks that have the access sequence identifier and that are predicted to be in the dead state, that a cache block whose dirty block identifier is valid is to be in the live state is further determined; and after the predicting that a cache block having the access sequence identifier is to be in the live state, among cache blocks that have the access sequence identifier and that are predicted to be in the live state, that a cache block whose validity identifier is invalid is to be in the dead state is further determined.

Further, according to the fifth aspect of the embodiments of the present disclosure, the backing up data of a cache block that is predicted to be in the live state to the nonvolatile memory unit includes:

recording information about a cache block that is predicted to be in the dead state to a dead cache block recording table; and determining, according to the information that is about the cache block predicted to be in the dead state and that is recorded in the dead cache block recording table, whether a current to-be-backed-up cache block is a cache block that is predicted to be in the dead state or a cache block that is predicted to be in the live state; and if the current to-be-backed-up cache block is a cache block that is predicted to be in the live state, backing up data in the current to-be-backed-up cache block; or if the current to-be-backed-up cache block is a cache block that is predicted to be in the dead state, skipping backing up data in the current to-be-backed-up cache block.

A sixth aspect of the embodiments of the present disclosure provides a data backup apparatus including a memory and a processor, where the memory includes a volatile memory unit, a nonvolatile memory unit, a microprocessor, and a backup power supply;

the volatile memory unit includes M cache block sets, each cache block set includes N cache blocks, $M \geq 1$, $N > 1$, each cache block has an access sequence identifier, the access sequence identifier is used to indicate a sequence that a cache block is accessed in a cache block set, and cache blocks having a same access sequence in all cache block sets of the M cache block sets have a same access sequence identifier;

after the data backup apparatus is powered on at a time point $T_0$, the processor is configured to: recover data backed up in the nonvolatile memory unit to the volatile memory unit; perform a data operation on the volatile memory unit; when a cache block corresponding to the current data operation is accessed for the first time after power-on, determine that the cache block corresponding to the current data operation is a live cache block, and count live cache blocks corresponding to an initial access sequence identifier of the cache block corresponding to the current data operation at the time point $T_0$; or when a cache block corresponding to the current data operation is evicted for the first time after power-on, determine that the cache block corresponding to the current data operation is a dead cache block, and count dead cache blocks corresponding to an initial access sequence identifier of the cache block corresponding to the current data operation at the time point $T_0$; and after the data backup apparatus is powered off at a time point $T_1$, the microprocessor is configured to: start the backup power supply to power the memory; calculate a cache block state ratio corresponding to each initial access sequence identifier at the time point $T_0$, according to a quantity of the dead cache blocks corresponding to the initial access sequence at the time point $T_0$ and a quantity of the live cache blocks corresponding to the initial access sequence at the time point $T_0$; compare a cache block state ratio corresponding to each initial access sequence identifier at the time point $T_0$ with a preset threshold; predict, according to a comparison result corresponding to each initial access sequence identifier at the time point $T_0$, whether a cache block in the nonvolatile memory unit is to be live cache blocks or dead cache blocks at the time point $T_1$; and back up data of a cache block that is predicted to be in the live state to the nonvolatile memory unit.

Further, according to the sixth aspect of the embodiments of the present disclosure, each cache block is configured with a state identifier; and after recovering the data backed up in the nonvolatile memory unit to the volatile memory unit, the processor is further configured to set a state identifier of each cache block in the volatile memory unit to that the cache block is not sampled, and after any counting, change a state identifier of a cache block corresponding to the current data operation to that the cache block is sampled; and the processor is further configured to: when the cache block corresponding to the current data operation is accessed and the state identifier of the cache block corresponding to the current data operation is that the cache block is not sampled, determine that the cache block corresponding to the current data operation is accessed for the first time after power-on; or when the cache block corresponding to the current data operation is evicted and the state identifier of the cache block corresponding to the current data operation is that the cache block is not sampled, determine that the cache block corresponding to the current data operation is evicted for the first time after power-on.

Further, according to the sixth aspect of the embodiments of the present disclosure, during the predicting, according to a comparison result corresponding to each initial access sequence identifier at the time point $T_0$, whether a cache block in the nonvolatile memory unit is to be live cache blocks or dead cache blocks at the time point $T_1$, the microprocessor is specifically configured to:

when a comparison result corresponding to a first access sequence identifier of the N initial access sequence identifiers that are at the time point $T_0$ is not less than the preset threshold, the microprocessor predicts that a cache block having the first access sequence identifier is to be in the dead state; or when a comparison result corresponding to a second access sequence identifier of the N initial access sequence identifiers that are at the time point $T_0$ is less than the preset threshold, the microprocessor predicts that a cache block having the second access sequence identifier is to be in the live state.

Further, according to the sixth aspect of the embodiments of the present disclosure, each cache block further includes a valid block identifier and a dirty block identifier, the valid block identifier is used to identify whether the cache block is valid, and the dirty block identifier is used to identify whether the cache block is a dirty block;

after predicting that a cache block having the first access sequence identifier is to be in the dead state, the microprocessor further determines that, among cache blocks that have the first access sequence identifier and that are predicted to be in the dead state, a cache block whose dirty block identifier is valid is to be in the live state; and after predicting that a cache block having the second access sequence identifier is to be in the live state, the microprocessor further determines that, among cache blocks that have the second access sequence identifier and that are predicted to be in the live state, a cache block whose validity identifier is invalid is to be in the dead state.

Further, according to the sixth aspect of the embodiments of the present disclosure, the backing up, by the microprocessor, data of a cache block that is predicted to be in the live state to the nonvolatile memory unit includes: recording, by the microprocessor, information about a cache block that is predicted to be in the dead state to a dead cache block recording table; determining, according to the information that is about the cache block predicted to be in the dead state and that is recorded in the dead cache block recording table, whether a current to-be-backed-up cache block is a cache block that is predicted to be in the dead state or a cache block that is predicted to be in the live state; and if the current to-be-backed-up cache block is a cache block that is predicted to be in the live state, backing up data in the current to-be-backed-up cache block, or if the current to-be-backed-up cache block is a cache block that is predicted to be in the dead state, skipping backing up data in the current to-be-backed-up cache block.

Further, according to the sixth aspect of the embodiments of the present disclosure, the preset threshold is 0.5.

A seventh aspect of the embodiments of the present disclosure provides a data backup apparatus, where the data backup apparatus includes a memory and a processor, and the memory includes a volatile memory unit, a nonvolatile memory unit, a microprocessor, and a backup power supply;

the volatile memory unit includes M cache block sets, each cache block set includes N cache blocks, M≥1, N>1, each cache block has an access sequence identifier, the access sequence identifier is used to indicate a sequence that a cache block is accessed in a cache block set, and cache blocks having a same access sequence in all cache block sets of the M cache block sets have a same access sequence identifier;

after the data backup apparatus is powered on at a time point $T_0$, the processor is configured to: recover data backed up in the nonvolatile memory unit to the volatile memory unit; perform a data operation on the volatile memory unit; when a cache block corresponding to the current data operation is accessed for the first time after power-on, determine that the cache block corresponding to the current data operation is a live cache block, and count live cache blocks corresponding to an initial access sequence identifier of the cache block corresponding to the current data operation at the time point $T_0$; or when a cache block corresponding to the current data operation is evicted for the first time after power-on, determine that the cache block corresponding to the current data operation is a dead cache block, and count dead cache blocks corresponding to an initial access sequence identifier of the cache block corresponding to the current data operation at the time point $T_0$; and after the data backup apparatus is powered off at a time point $T_1$, the microprocessor is configured to: start the backup power supply to power the memory; calculate a cache block state ratio corresponding to each initial access sequence identifier at the time point $T_0$, according to a quantity of the dead cache blocks corresponding to the initial access sequence at the time point $T_0$ and a quantity of the live cache blocks corresponding to the initial access sequence at the time point $T_0$; establish a common relationship between a common access sequence identifier and a common ratio according to the N initial access sequence identifiers that are at the time point $T_0$ and the calculated ratios respectively corresponding to the N initial access sequence identifiers that are at the time point $T_0$; determine, according to the common relationship, a corresponding common access sequence identifier when the common ratio is 1 to 2; compare each initial access sequence identifier at the time point $T_0$ with the determined common access sequence identifier; predict, according to a comparison result corresponding to each initial access sequence identifier at the time point $T_0$, whether a cache block in the nonvolatile memory unit is to be in a live state or a dead state at a time point $T_1$; and back up data of a cache block that is predicted to be in the live state to the nonvolatile memory unit, where the time point $T_1$ is a time point at which the data backup apparatus is powered off.

Further, according to the seventh aspect of the embodiments of the present disclosure, each cache block is configured with a state identifier; and after recovering the data backed up in the nonvolatile memory unit to the volatile memory unit, the processor is further configured to set a state identifier of each cache block in the volatile memory unit to that the cache block is not sampled, and after any counting, change a state identifier of a cache block corresponding to the current data operation to that the cache block is sampled; and the processor is further configured to: when the cache block corresponding to the current data operation is accessed and the state identifier of the cache block corresponding to the current data operation is that the cache block is not sampled, determine that the cache block corresponding to the current data operation is accessed for the first time after power-on; or when the cache block corresponding to the current data operation is evicted and the state identifier of the cache block corresponding to the current data operation is that the cache block is not sampled, determine that the cache block corresponding to the current data operation is evicted for the first time after power-on.

Further, according to the seventh aspect of the embodiments of the present disclosure, during the predicting, according to a comparison result corresponding to each initial access sequence identifier at the time point $T_0$, whether a cache block in the nonvolatile memory unit is to be in the live state or the dead state at the time point $T_1$, the microprocessor is specifically configured to:

when a comparison result corresponding to a first access sequence identifier of the N initial access sequence identifiers that are at the time point $T_0$ is not less than the determined common access sequence identifier, the microprocessor predicts that a cache block having the first access sequence identifier is to be in the dead state; and when a comparison result corresponding to a second access sequence identifier of the N initial access sequence identifiers that are at the time point $T_0$ is less than the determined common access sequence identifier, the microprocessor predicts that a cache block having the access sequence identifier is to be in the live state.

Further, according to the seventh aspect of the embodiments of the present disclosure, each cache block further includes a valid block identifier and a dirty block identifier, the valid block identifier is used to identify whether the cache block is valid, and the dirty block identifier is used to identify whether the cache block is a dirty block;

after predicting that a cache block having the first access sequence identifier is to be in the dead state, the microprocessor further determines that, among cache blocks that have the first access sequence identifier and that are predicted to be in the dead state, a cache block whose dirty block identifier is valid is to be in the live state; and after predicting that a cache block having the second access sequence identifier is to be in the live state, the microprocessor further determines that, among cache blocks that have the second access sequence identifier and that are predicted to be in the live state, a cache block whose validity identifier is invalid is to be in the dead state.

Further, according to the seventh aspect of the embodiments of the present disclosure, the backing up, by the microprocessor, data of a cache block that is predicted to be in the live state to the nonvolatile memory unit includes: recording, by the microprocessor, information about a cache block that is predicted to be in the dead state to a dead cache block recording table; determining, according to the information that is about the cache block predicted to be in the dead state and that is recorded in the dead cache block recording table, whether a current to-be-backed-up cache block is a cache block that is predicted to be in the dead state or a cache block that is predicted to be in the live state; and if the current to-be-backed-up cache block is a cache block that is predicted to be in the live state, backing up data in the current to-be-backed-up cache block, or if the current to-be-backed-up cache block is a cache block that is predicted to be in the dead state, skipping backing up data in the current to-be-backed-up cache block.

An eighth aspect of the embodiments of the present disclosure provides a data backup method applied to a data backup apparatus, where the data backup apparatus includes a memory, and the memory includes a volatile memory unit, a nonvolatile memory unit, and a backup power supply;

the volatile memory unit includes M cache block sets, each cache block set includes N cache blocks, M≥1, N>1, each cache block has an access sequence identifier, the access sequence identifier is used to indicate a sequence that a cache block is accessed in a cache block set, and cache blocks having a same access sequence in all cache block sets of the M cache block sets have a same access sequence identifier; and the method includes:

after the data backup apparatus is powered on at a time point $T_0$, recovering data backed up in the nonvolatile memory unit to the volatile memory unit, and performing a data operation on the volatile memory unit; when a cache block corresponding to the current data operation is accessed for the first time after power-on, determining that the cache block corresponding to the current data operation is a live cache block, and counting live cache blocks corresponding to an initial access sequence identifier of the cache block corresponding to the current data operation at the time point $T_0$; or when a cache block corresponding to the current data operation is evicted for the first time after power-on, determining that the cache block corresponding to the current data operation is a dead cache block, and counting dead cache blocks corresponding to an initial access sequence identifier of the cache block corresponding to the current data operation at the time point $T_0$; and after the data backup apparatus is powered off at a time point $T_1$, starting the backup power supply to power the memory;

calculating a cache block state ratio corresponding to each initial access sequence identifier at the time point $T_0$;

calculating a cache block state ratio corresponding to each initial access sequence identifier at the time point $T_0$, according to a quantity of the dead cache blocks corresponding to the initial access sequence at the time point $T_0$ and a quantity of the live cache blocks corresponding to the initial access sequence at the time point $T_0$; and predicting, according to a comparison result corresponding to each initial access sequence identifier at the time point $T_0$, whether a cache block in the nonvolatile memory unit is to be live cache blocks or dead cache blocks at the time point $T_1$; and backing up data of a cache block that is predicted to be in the live state to the nonvolatile memory unit.

Further, according to the eighth aspect of the embodiments of the present disclosure, each cache block is configured with a state identifier; and after the recovering the data backed up in the nonvolatile memory unit to the volatile memory unit, the method further includes:

setting a state identifier of each cache block in the volatile memory unit to that the cache block is not sampled, and after any counting, changing a state identifier of a cache block corresponding to the current data operation to that the cache block is sampled;

the determining that a cache block corresponding to the current data operation is evicted for the first time after power-on is specifically:

when the cache block corresponding to the current data operation is accessed and the state identifier of the cache block corresponding to the current data operation is that the cache block is not sampled, determining that the cache block corresponding to the current data operation is accessed for the first time after power-on; and the determining that a cache block corresponding to the current data operation is evicted for the first time after power-on is specifically:

when the cache block corresponding to the current data operation is evicted and the state identifier of the cache block corresponding to the current data operation is that the cache block is not sampled, determining that the cache block corresponding to the current data operation is evicted for the first time after power-on.

Further, according to the eighth aspect of the embodiments of the present disclosure, the predicting, according to a comparison result corresponding to each initial access sequence identifier at the time point $T_0$, whether a cache block in the nonvolatile memory unit is to be in the live state or the dead state at a time point $T_1$ includes:

when a comparison result corresponding to a first access sequence identifier of the N initial access sequence identifiers that are at the time point $T_0$ is not less than the preset threshold, predicting that a cache block having the first access sequence identifier is to be in the dead state; or when a comparison result corresponding to a second access sequence identifier of the N initial access sequence identifiers that are at the time point $T_0$ is less than the preset threshold, predicting that a cache block having the first access sequence identifier is to be in the live state.

Further, according to the eighth aspect of the embodiments of the present disclosure, each cache block further includes a valid block identifier and a dirty block identifier, the valid block identifier is used to identify whether the cache block is valid, and the dirty block identifier is used to identify whether the cache block is a dirty block;

after the predicting that a cache block having the access sequence identifier is to be in the dead state, among cache blocks that have the access sequence identifier and that are predicted to be in the dead state, that a cache block whose dirty block identifier is valid is to be in the live state is further determined; and after the predicting that a cache block having the access sequence identifier is to be in the live state, among cache blocks that have the access sequence identifier and that are predicted to be in the live state, that a cache block whose validity identifier is invalid is to be in the dead state is further determined.

Further, according to the eighth aspect of the embodiments of the present disclosure, the backing up data of a cache block that is predicted to be in the live state to the nonvolatile memory unit includes:

recording information about a cache block that is predicted to be in the dead state to a dead cache block recording table; and determining, according to the information that is about the cache block predicted to be in the dead state and that is recorded in the dead cache block recording table, whether a current to-be-backed-up cache block is a cache block that is predicted to be in the dead state or a cache block that is predicted to be in the live state; and if the current to-be-backed-up cache block is a cache block that is predicted to be in the live state, backing up data in the current to-be-backed-up cache block; or if the current to-be-backed-up cache block is a cache block that is predicted to be in the dead state, skipping backing up data in the current to-be-backed-up cache block.

Further, according to the eighth aspect of the embodiments of the present disclosure, the preset threshold is 0.5.

A ninth aspect of the embodiments of the present disclosure provides a data backup method applied to a data backup apparatus, where the data backup apparatus includes a memory, and the memory includes a volatile memory unit, a nonvolatile memory unit, and a backup power supply;

the volatile memory unit includes M cache block sets, each cache block set includes N cache blocks, M≥1, N>1, each cache block has an access sequence identifier, the access sequence identifier is used to indicate a sequence that a cache block is accessed in a cache block set, and cache blocks having a same access sequence in all cache block sets of the M cache block sets have a same access sequence identifier; and the method includes:

after the data backup apparatus is powered on at a time point $T_0$, recovering data backed up in the nonvolatile memory unit to the volatile memory unit, and performing a data operation on the volatile memory unit; when a cache block corresponding to the current data operation is accessed for the first time after power-on, determining that the cache block corresponding to the current data operation is a live cache block, and counting live cache blocks corresponding to an initial access sequence identifier of the cache block corresponding to the current data operation at the time point $T_0$; or when a cache block corresponding to the current data operation is evicted for the first time after power-on, determining that the cache block corresponding to the current data operation is a dead cache block, and counting dead cache blocks corresponding to an initial access sequence identifier of the cache block corresponding to the current data operation at the time point $T_0$; and starting the backup power supply to power the memory;

calculating a cache block state ratio corresponding to each initial access sequence identifier at the time point $T_0$, according to a quantity of the dead cache blocks corresponding to the initial access sequence at the time point $T_0$ and a quantity of the live cache blocks corresponding to the initial access sequence at the time point $T_0$;

establishing a common relationship between a common access sequence identifier and a common ratio according to the N initial access sequence identifiers that are at the time point $T_0$ and the calculated ratios respectively corresponding to the N initial access sequence identifiers that are at the time point $T_0$, and determining, according to the common relationship, a corresponding common access sequence identifier when the common ratio is 1 to 2; and comparing each initial access sequence identifier at the time point $T_0$ with the determined common access sequence identifier; predicting, according to a comparison result corresponding to each initial access sequence identifier at the time point $T_0$, whether a cache block in the nonvolatile memory unit is to be in a live state or a dead state at a time point $T_1$; and backing up data of a cache block that is predicted to be in the live state to the nonvolatile memory unit, where the time point $T_1$ is a time point at which the data backup apparatus is powered off.

Further, according to the ninth aspect of the embodiments of the present disclosure, each cache block is configured with a state identifier; and after the recovering the data backed up in the nonvolatile memory unit to the volatile memory unit, the method further includes:

setting a state identifier of each cache block in the volatile memory unit to that the cache block is not sampled, and after any counting, changing a state identifier of a cache block corresponding to the current data operation to that the cache block is sampled;

the determining that a cache block corresponding to the current data operation is evicted for the first time after power-on is specifically:

when the cache block corresponding to the current data operation is accessed and the state identifier of the cache block corresponding to the current data operation is that the cache block is not sampled, determining that the cache block corresponding to the current data operation is accessed for the first time after power-on; and the determining that a cache block corresponding to the current data operation is evicted for the first time after power-on is specifically:

when the cache block corresponding to the current data operation is evicted and the state identifier of the cache block corresponding to the current data operation is that the cache block is not sampled, determining that the cache block corresponding to the current data operation is evicted for the first time after power-on.

Further, according to the ninth aspect of the embodiments of the present disclosure, the predicting, according to a comparison result corresponding to each initial access sequence identifier at the time point $T_0$, whether a cache block in the nonvolatile memory unit is to be in the live state or the dead state at a time point $T_1$ specifically includes:

when a comparison result corresponding to a first access sequence identifier of the N initial access sequence identifiers that are at the time point $T_0$ is not less than the determined common access sequence identifier, predicting, by the microprocessor, that a cache block having the first access sequence identifier is to be in the dead state; and when a comparison result corresponding to a second access sequence identifier of the N initial access sequence identifiers that are at the time point $T_0$ is less than the determined common access sequence identifier, predicting, by the microprocessor, that a cache block having the access sequence identifier is to be in the live state.

Further, according to the ninth aspect of the embodiments of the present disclosure, each cache block further includes a valid block identifier and a dirty block identifier, the valid block identifier is used to identify whether the cache block is valid, and the dirty block identifier is used to identify whether the cache block is a dirty block;

after the predicting that a cache block having the access sequence identifier is to be in the dead state, among cache blocks that have the access sequence identifier and that are predicted to be in the dead state, that a cache block whose dirty block identifier is valid is to be in the live state is further determined;

after the predicting that a cache block having the access sequence identifier is to be in the live state, among cache blocks that have the access sequence identifier and that are predicted to be in the live state, that a cache block whose validity identifier is invalid is to be in the dead state is further determined;

each cache block is configured with a state identifier; and after the recovering the data backed up in the nonvolatile memory unit to the volatile memory unit, the method further includes:

setting a state identifier of each cache block in the volatile memory unit to that the cache block is not sampled, and after any counting, changing a state identifier of a cache block corresponding to the current data operation to that the cache block is sampled;

the determining that a cache block corresponding to the current data operation is evicted for the first time after power-on is specifically:

when the cache block corresponding to the current data operation is accessed and the state identifier of the cache block corresponding to the current data operation is that the cache block is not sampled, determining that the cache block corresponding to the current data operation is accessed for the first time after power-on; and the determining that a cache block corresponding to the current data operation is evicted for the first time after power-on is specifically:

when the cache block corresponding to the current data operation is evicted and the state identifier of the cache block corresponding to the current data operation is that the cache block is not sampled, determining that the cache block corresponding to the current data operation is evicted for the first time after power-on.

Further, according to the ninth aspect of the embodiments of the present disclosure, the backing up data of a cache block that is predicted to be in the live state to the nonvolatile memory unit includes:

recording information about a cache block that is predicted to be in the dead state to a dead cache block recording table; and determining, according to the information that is about the cache block predicted to be in the dead state and that is recorded in the dead cache block recording table, whether a current to-be-backed-up cache block is a cache block that is predicted to be in the dead state or a cache block that is predicted to be in the live state; and if the current to-be-backed-up cache block is a cache block that is predicted to be in the live state, backing up data in the current to-be-backed-up cache block; or if the current to-be-backed-up cache block is a cache block that is predicted to be in the dead state, skipping backing up data in the current to-be-backed-up cache block.

It may be known that, according to the data backup apparatus and method in the embodiments of the present disclosure, when the data backup apparatus is powered on, a quantity of dead blocks and a quantity of live blocks are counted, where the dead blocks and the live blocks correspond to a sequence access identifier that is at a time point when the data backup apparatus is powered on. After the data backup apparatus is powered off, a proportion occupied by dead blocks corresponding to each sequence access identifier at the power-on time point in a total quantity of sampled cache blocks corresponding to the sequence access identifier, is calculated according to the counted quantities of dead blocks and live blocks that correspond to the sequence access identifier at the time point when the data backup apparatus is powered on. The calculated proportion is compared with a preset threshold, and a dead block in a volatile memory unit is predicted according to a comparison result. During backup, a cache block that is predicted to be a dead block is not backed up, which reduces a backup data volume and improves backup efficiency.

BRIEF DESCRIPTION OF DRAWINGS

The following briefly describes the accompanying drawings used in describing the embodiments or the prior art.

FIG. 2 is a schematic diagram of sequence access identifiers in a four-way set associative memory;

DESCRIPTION OF EMBODIMENTS

The following describes the technical solutions in the embodiments of the present disclosure with reference to the accompanying drawings.

Technical solutions provided in the embodiments of the present disclosure are typically applied to a memory device that has both a nonvolatile memory unit and a volatile memory unit, an example of which is a nonvolatile static random access memory (NV-SRAM). After an electronic apparatus having a memory of such a structure is powered off, a backup power supply may be used to power the memory, for backing up data in the volatile memory unit to the nonvolatile memory unit. For convenient of description, an NV-SRAM is used as an example in the following disclosure. However, it should be noted that memories to which the present disclosure is applied are not limited to NV-SRAMs, and other memories of a same structure are also included in the scope of the present disclosure.

In a NV-SRAM, a volatile memory unit is a static random access memory (SRAM), a nonvolatile memory unit is a phase-change random access memory (PCM), and a backup power supply is an on-chip energy storage capacitor.

As shown in FIG. 2, which is a structural diagram of a volatile memory unit according to an embodiment of the present disclosure, the volatile memory unit is an N-way set associative memory. N-way set associative means that cache blocks of the volatile memory unit are grouped into N ways and M sets, and each set has N cache blocks, where N is greater than 1, and M is greater than or equal to 1. For the convenience of description, a four-way set associative volatile memory unit is used as an example, that is, each set has four cache blocks. Generally, an N-way set associative memory unit uses a least recently used (LRU) replacement algorithm. When all cache blocks in each set are fully written with data, if new data needs to be written into the volatile memory unit, data least recently used in the cache block is replaced to a low-class memory. A cache block whose data is replaced to a low-class memory may be considered as an evicted cache block. In the embodiments, an evicted cache block is considered as a cache block in a dead state, that is a dead block. In addition, some cache blocks marked as invalid blocks do not store valid data, and these cache blocks may also be considered as dead blocks. When the cache block in the memory is accessed (reference) for a read/write operation on the data, it may be considered that the accessed cache block is a cache block in a live state, that is, a live block.

Figure 1:
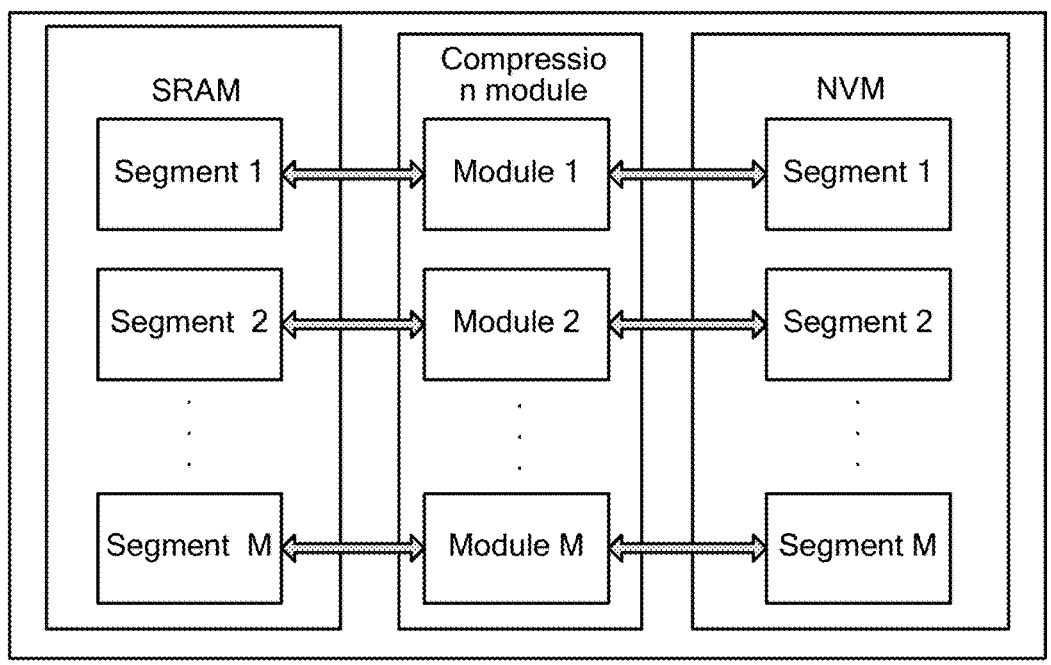
FIG. 1 is a schematic diagram of an existing process for backing up data stored in a volatile memory unit of a nonvolatile static random access memory to a nonvolatile memory unit of the nonvolatile static random access memory.
Figure 3:
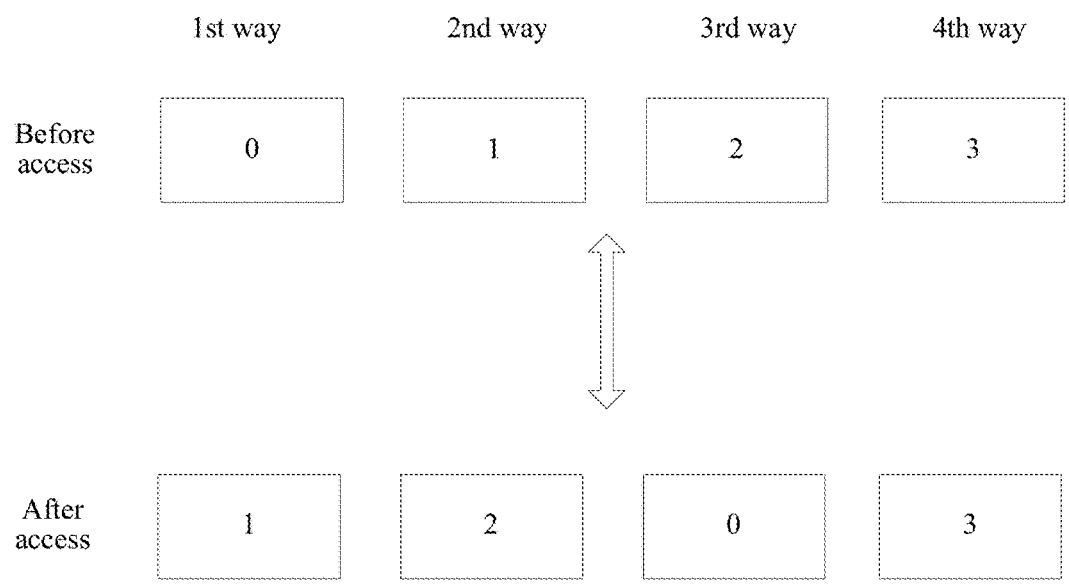
FIG. 3 is a schematic diagram of changed sequence access identifiers in a four-way set associative memory after a cache block is accessed.

In the LRU algorithm, access sequence identifiers are used to represent an access sequence of cache blocks in each set. The access sequence identifiers may be set by using a recently used bit (RUB) of each cache block. If the memory is an N-way set associative memory, cache blocks having a same access sequence in cache block sets have a same access sequence identifier. An access sequence identifier of a cache block is updated with a change of the sequence that the cache blocks are accessed in a cache block set. A greater value of an access sequence identifier indicates a longer interval between a last access time point and a current time point. However, in a different embodiment, an opposite arrangement of the sequence may also be used, that is, a greater value of the access sequence identifier indicates a shorter interval between the last access time point and the current time point. Specific arrangements may be made according to actual situations. As shown in FIG. 2, a number on each cache block indicates an access sequence identifier of the cache block in each set, and the access sequence identifier value may be changed dynamically according to an access status of each cache block. As shown in FIG. 3, an access sequence of cache blocks in a first set is used as an example. Before access, access sequence identifiers of the cache blocks are 0, 1, 2, and 3 respectively according to a sequence from a first way to a fourth way, and when a cache block of a third way is accessed, the access sequence identifiers of the cache blocks are changed to 1, 2, 0, and 3.

The volatile memory unit in the embodiments of the present disclosure may alternatively be a memory of a fully associative structure. That is, all cache blocks in the volatile memory unit may be used as one set of cache blocks.

Generally, after an electronic device is powered off, backing up data in dead blocks in a volatile memory unit is unnecessary. If these dead blocks can be recognized in advance, after the electronic device is powered off, a volume of data that needs to be backed up can be reduced, which improves backup efficiency. In the technical solutions provided in the embodiments of the present disclosure, after an electronic device is powered off, dead blocks in a volatile memory unit can be predicted according to statistic values obtained when the electronic device is power on, and data in the dead blocks is not backed up during data backup, which reduces a backup data volume and improves backup efficiency.

The following describes, from different aspects, the technical solutions provided in different embodiments of the present disclosure.

Embodiment 1

Figure 4:
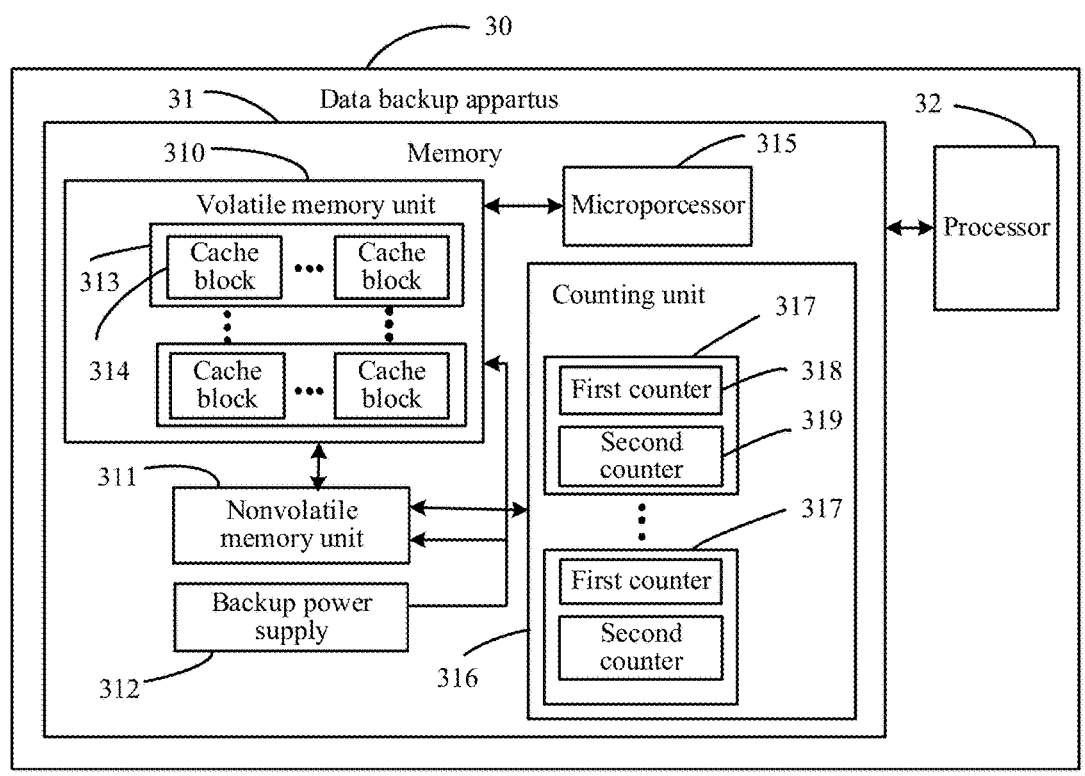
FIG. 4 is a structural diagram of a data backup apparatus provided in Embodiment 1 of the present disclosure.

A data backup apparatus provided by this embodiment is shown in FIG. 4. The data backup apparatus 30 includes a memory 31 and a processor 32. The memory 31 includes a volatile memory unit 310, a nonvolatile memory unit 311, a backup power supply 312, a microprocessor 315, and a counting unit 316. After the data backup apparatus 30 is powered off, the backup power supply 312 is started to power the memory 30, so as to back up data in the volatile memory unit 310 to the nonvolatile memory unit 311.

The volatile memory unit 310 includes M (M≥1) cache block sets 313, and each cache block set 313 includes N (N>1) cache blocks 314. Cache blocks 314 that have a same access sequence in the cache block sets 313 have a same access sequence identifier, and access sequence identifiers of cache blocks 314 a cache block set 313 are updated with a change of the sequence when a cache block 314 is accessed in the cache block set 313. An access sequence identifier of each cache block may be stored in an RUB of the cache block 314, or may be recorded in a table.

Each cache block 314 is further configured with a state identifier, and each state identifier is used to identify whether a cache block 314 is sampled. In this embodiment, sampling statistics need to be collected on cache blocks 314 in the volatile memory unit 310, and each cache block 314 can only be sampled once. Whether a cache block 314 is sampled is identified by setting a status identifier. For a cache block that has been sampled, a status identifier of the cache block may be changed to "sampled." A cache block 314 whose status identifier is "sampled" is not sampled any more.

The counting unit 316 includes N counter groups 317, each counter group 317 includes a first counter 318 and a second counter 319, and the N counter groups 317 have a one-to-one correspondence with the N access sequence identifiers. Functions of the counting unit 316 will be described in detail later.

After the data backup apparatus 30 is powered on, the processor 32 recovers data backed up in the nonvolatile memory unit 311 to the volatile memory unit 310, obtains and records an access sequence identifier that is of each cache block 314 in each cache block set 313 and that is at a time point $T_0$, and sets a status identifier of each cache block 314 in the volatile memory unit 310 to that the cache block is not sampled. The time point $T_0$ is a time point at which the data backup apparatus is powered on.

In this embodiment, an access sequence identifier of each cache block 314 at the time point $T_0$ is an access sequence identifier of the cache block 314 when the data backup apparatus 30 is powered off last time. That is, each time after being powered on, the data backup apparatus 30 not only recovers the data backed up in the nonvolatile memory unit 311 to the volatile memory unit 310, but also recovers the access sequence identifier of each cache block 314 at the time when the data backup apparatus 30 is powered off last time. In addition, each time after being powered on, the data backup apparatus 30 may also initialize a status identifier of each cache block 314 as that the cache block is not sampled.

The processor 32 may perform a data operation on the volatile memory unit 310. The data operation is an operation performed on data stored in cache blocks 314 in the volatile memory unit 310, such as reading, writing, deleting, or replacing. When performing the data operation, the processor 32 obtains, according to address information in a data operation request corresponding to the data operation, a cache block 314 corresponding to the data operation. After the cache block 314 corresponding to the data operation is determined, a status identifier of the cache block may be determined.

When the status identifier of the cache block 314 corresponding to the current data operation is "not sampled" and the cache block 314 corresponding to the data operation is accessed, the cache block 314 corresponding to the current data operation is in a live state. A counting is performed on a first counter 318 corresponding to an initial access sequence identifier of the cache block 314 corresponding to the current data operation at the time point $T_0$, and the status identifier of the cache block 314 is updated to that the cache block is "sampled." When the status identifier of the cache block 314 corresponding to the current data operation is "not sampled" and the cache block 314 corresponding to the data operation is evicted, the cache block 314 corresponding to the current data operation is in a dead state. A counting is performed on a second counter 319 corresponding to an initial access sequence identifier of the cache block corresponding to the current data operation at the time point $T_0$, and the status identifier of the cache block 314 corresponding to the current data operation is changed to that the cache block is "sampled."

In this embodiment, a cache block 314 that is in the live state is a live block, and a cache block 314 that is in the dead state is a dead block. For definitions of the live block and the dead block, refer to the foregoing description, and details are not described herein again. In addition, a sampled cache block 314 in this embodiment is either a cache block that is accessed for the first time after the data backup apparatus 30 is powered on or a cache block that is evicted for the first time after the data backup apparatus 30 is powered on.

In this embodiment, as shown in FIG. 2, each cache block 314 has an access sequence identifier that is used to identify an access sequence of the cache block 314 in a cache block set 313. Therefore, multiple cache blocks 314 in multiple cache block sets have a same access sequence identifier. A first counter 318 corresponding to each access sequence identifier is used to count a quantity of live blocks among sampled cache blocks 314 having the access sequence identifier, and a second counter corresponding to each access sequence identifier is used to count a quantity of dead blocks among sampled cache blocks 314 having the access sequence identifier.

It can be seen from FIG. 2 that, if an access sequence identifier of a specific cache block 314 is "3" before the cache block is accessed, the access sequence identifier of the cache block 314 is updated to "0" after the cache block is accessed. Because a sampled cache block 314 has not yet been accessed, at the first time of access, the access sequence identifier of the cache block 314 is still an access sequence identifier that is at a time point $T_0$ and is assumed to be "3". After the cache block is accessed, the access sequence identifier of the cache block 314 is changed to "0". Herein, the processor 32 obtains the not yet changed access sequence identifier at the time point $T_0$, that is, "3" rather than "0".

In this embodiment, statistics collected by the first counter 318 and the second counter 319 is not reset to zero after the data backup apparatus 30 is powered off. Therefore, after the data backup apparatus 30 is powered on next time, statistics may be collected on a basis of the statistics collected this time. In this way, more cache blocks 314 may be sampled, and therefore, a more accurate prediction result is obtained.

After the data backup apparatus 30 is powered off, the microprocessor 315 turns on the backup power supply 312 to power the memory 31. The microprocessor 315 reads counts of the N counter groups 317, and calculates a ratio of a count of a second counter 319 in a counter group 317 corresponding to each access sequence identifier to a sum of a first counter 318 and the second counter 319 that are in the counter group 317 corresponding to the access sequence identifier. The microprocessor 315 compares a ratio corresponding to each access sequence identifier with a preset threshold, and predicts, according to a comparison result corresponding to each access sequence identifier, whether each cache block 314 that has an access sequence identifier corresponding to the comparison result is to be in the live state or the dead state. The microprocessor backs up data of a cache block that is predicted to be in the live state to the nonvolatile memory unit 311.

In this embodiment, a sum of a first counter 318 and a second counter 319 is a sum of counted dead blocks corresponding to each access sequence identifier and counted live blocks corresponding to the access sequence identifier, that is, a total quantity of sampled cache blocks 314 having the sequence access identifier. Therefore, what the microprocessor 315 calculates is a proportion occupied by dead blocks among sampled cache blocks having a same access sequence identifier.

Figure 5:
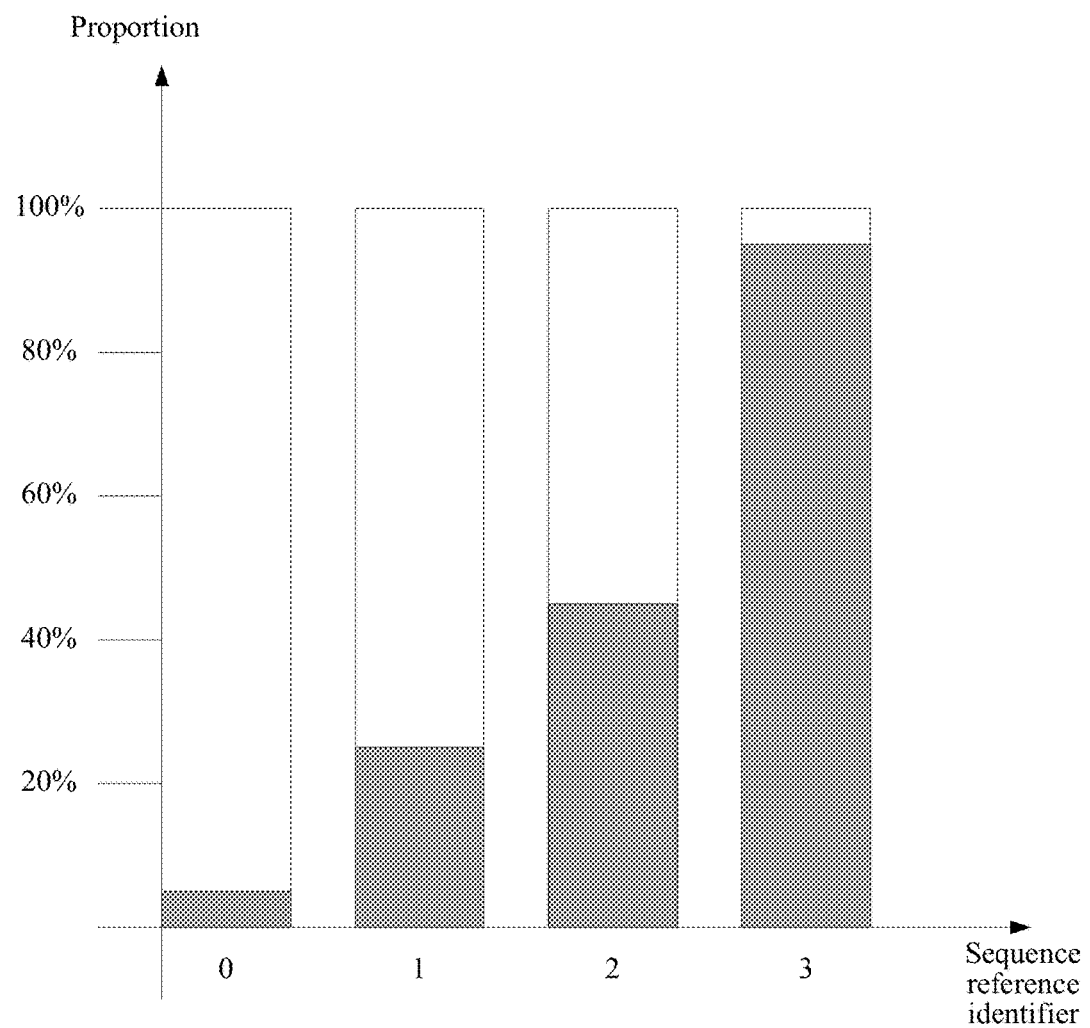
FIG. 5 is a schematic diagram of proportions of dead blocks corresponding to each of access sequence identifiers that is calculated when the data backup apparatus is powered on, according to Embodiment 1 of the present disclosure.

FIG. 5 is a schematic diagram of calculated proportions of dead blocks corresponding to each of the access sequence identifiers. A proportion occupied by dead blocks corresponding to an access sequence identifier 0 is 5%. A proportion occupied by dead blocks corresponding to an access sequence identifier 1 is 25%. A proportion occupied by dead blocks corresponding to an access sequence identifier 2 is 45%. A proportion occupied by dead blocks corresponding to an access sequence identifier 3 is 95%.

Alternatively, one can calculate a ratio of a count of a second counter 319 in a counter group 317 to a count of the first counter 318 in the counter group 317, that is, a ratio of dead blocks to live blocks. One can also calculate a ratio of a first counter 318 in a counter group 317 to a sum of the first counter 318 and a second counter 319 that are in the counter group 317, that is, a proportion occupied by live blocks among sampled cache blocks having a same access sequence identifier. A different preset threshold may be selected according to a different ratio calculation manner. That is, in this embodiment, a cache block state ratio corresponding to each initial access sequence identifier may be calculated according to the quantity of the dead cache blocks corresponding to the initial access sequence and the quantity of the live cache blocks corresponding to the initial access sequence. The cache block state ratio may be a ratio of dead blocks to live blocks, a proportion occupied by dead blocks, or a proportion occupied by live blocks.

In the example shown in FIG. 5, if a proportion occupied by dead blocks among sampled cache blocks having a same access sequence identifier is calculated, and the preset threshold is 80%, it may be known that, after a proportion corresponding to each access sequence identifier is compared with the preset threshold, comparison results corresponding to access sequence identifiers 0, 1, and 2 are all less than the preset threshold, and a comparison result corresponding to an access sequence identifier 3 is not less than the preset threshold.

One manner for predicting, according to a comparison result corresponding to each access sequence identifier, whether a cache block 314 having an access sequence identifier that corresponds to the comparison result is to be in the live state or the dead state is as follows:

When a comparison result corresponding to an access sequence identifier of the N access sequence identifiers is not less than the preset threshold, predicting, by the microprocessor 315, that a cache block 314 having the access sequence identifier is in the dead state, and when a comparison result corresponding to an access sequence identifier of the N access sequence identifiers is less than the preset threshold, predicting, by the microprocessor 315, that a cache block having the access sequence identifier is in the live state.

In the example shown in FIG. 5, because a comparison result corresponding to the access sequence identifier 3 is not less than the preset threshold, it may be predicted that cache blocks 314 having the access sequence identifier 3 in the volatile memory unit 310 are all dead blocks.

Because the technical solution in the foregoing embodiment is a prediction for dead blocks, an error inevitably exists. Generally, errors may be classified into two types, that is, false negative errors and false positive errors. A false negative error means that a dead block is determined as a live block. An error of this type results in unnecessary consumption of electric energy. When electric energy of a power supply is limited, this wastes electric energy for backing up live blocks, and loss of a live block causes loss of data, which effects system performance. A false positive error means that a live block is determined as a dead block. An error of this type causes drop of data in a live block, which affects system performance. Therefore, a user may select a preset threshold according to different requirements, and specifically, may perform the setting according to the following requirements:

If electric energy of the backup power supply is enough to support data backup, and there is a high requirement for system performance, a higher preset threshold may be selected to control false negative errors, back up more cache blocks, and reduce data loss.

If electric energy of the backup power supply is not enough and possibly cannot support full backup of data, while a requirement for system real-time performance is relatively low, a lower preset threshold is selected to control false positive errors, drop as many dead blocks as possible, and prevent a backup failure caused when the electric energy of the backup power supply fails to support data backup.

A total error is minimized, that is, a sum of the false negative errors and the false positive errors is minimized.

According to theoretic analysis, when a proportion occupied by dead blocks is 50%, the total error is the lowest.

To further reduce errors, another manner is provided for predicting, according to a comparison result corresponding to each access sequence identifier, whether each cache block 314 having an access sequence identifier that corresponds to the comparison result is to be in the live state or the dead state, that is:

Each cache block 314 further includes a valid block identifier and a dirty block identifier. The valid block identifier is used to identify whether the cache block is valid, and the dirty block identifier is used to identify whether the cache block is a dirty block.

When a comparison result corresponding to an access sequence identifier of the N access sequence identifiers is that a proportion occupied by dead blocks is not less than the preset threshold, the microprocessor 315 obtains cache blocks 314 having the access sequence identifier, and predicts that, among the cache blocks 314 having the access sequence identifier, a cache block whose dirty block identifier is valid is to be in the live state, and a cache block whose dirty block identifier is invalid is to be in the dead state.

When a comparison result corresponding to an access sequence identifier of the N access sequence identifiers is that a proportion occupied by dead blocks is less than the preset threshold, the microprocessor 315 obtains cache blocks 314 having the access sequence identifier, and predicts that, among the cache blocks 314 having the access sequence identifier, a cache block 314 whose valid block identifier is valid is to be in the live state, and a cache block 314 whose valid block identifier is invalid is to be in the dead state.

In this way, some dead blocks are found, according to an valid block identifier, from cache blocks that are preliminarily determined as live blocks, and some live blocks are found, according to a dirty block identifier, from cache blocks that are preliminarily determined as dead blocks, so that prediction errors are further reduced.

In addition, the backing up, by the microprocessor 315, data of a cache block 314 that is predicted to be in the live state to the nonvolatile memory unit 311 includes: recording, by the microprocessor 315, information about a cache block 314 that is predicted to be in the dead state to a dead cache block recording table, determining, according to the information that is about the cache block 314 predicted to be in the dead state and that is recorded in the dead cache block recording table, whether a current to-be-backed-up cache block 314 is a cache block that is predicted to be in the dead state or a cache block that is predicted to be in the live state; and if the current to-be-backed-up cache block is a cache block that is predicted to be in the live state, backing up data in the current to-be-backed-up cache block, or if the current to-be-backed-up cache block 314 is a cache block that is predicted to be in the dead state, skipping backing up data in the current to-be-backed-up cache block.

Embodiment 2

Figure 6:
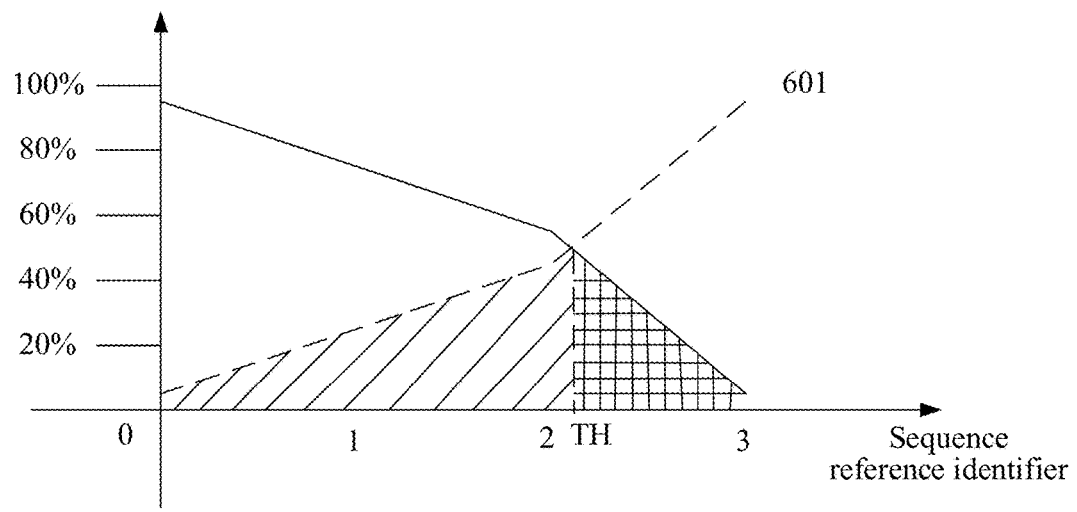
FIG. 6 is a schematic diagram of determining an access sequence identifier threshold based on distribution of calculated proportions corresponding to access sequence identifiers according to Embodiment 2 of the present disclosure.

Embodiment 2 provides a data backup apparatus. The data backup apparatus provided in Embodiment 2 is similar to the data backup apparatus in Embodiment 1. A difference lies in that: after the microprocessor 315 calculates a ratio of a count of a second counter 319 in a counter group 317 corresponding to each access sequence identifier to a sum of a first counter 318 and the second counter 319 that are in the counter group 317 corresponding to the access sequence identifier, a common relationship between a common access sequence identifier and a common ratio is established according to the N access sequence identifiers that are at a time point $T_0$ and the calculated ratios respectively corresponding to the N access sequence identifiers that are at the time point $T_0$. As shown in FIG. 6, a coordinate system is first established with a common access sequence identifier being an X axis and a common ratio (percentage) being a Y axis. The common access sequence identifier includes the access sequence identifiers 0, 1, 2, and 3, and also includes other corresponding ratios. The common ratio includes calculated ratios respectively corresponding to the access sequence identifiers 0, 1, 2, and 3, such as 5%, 25%, 45%, and 95% on the Y axis, and also includes any other value. Points (0, 5%), (1, 25%), (2, 45%) and (3, 95%) are taken from the coordinate system. The points are connected to form a common relationship curve 601 for a common sequence identifier and a common ratio. In this way, by using the relationship curve 601, a corresponding common access sequence identifier TH when the common ratio is 1 to 2 (50%, that is, when the ratio is 50%, the total error is the lowest) may be determined. Each access sequence identifier is compared with the determined common access sequence identifier TH, and, whether a cache block having the access sequence identifier corresponding to the comparison result is a cache block in the live state or a cache block in the dead state is determined according to a comparison result corresponding to each access sequence identifier. Specifically, when a first access sequence identifier of the access sequence identifiers is not less than the common access sequence identifier TH, the microprocessor predicts that a cache block having the first access sequence identifier is to be in the dead state. When a second access sequence identifier of the access sequence identifiers is less than the common access sequence identifier TH, the microprocessor predicts that a cache block having the second access sequence identifier is to be in the live state. Functions of other components are the same as those in Embodiment 1, and details are not described herein again.

Embodiment 3

Figure 7:
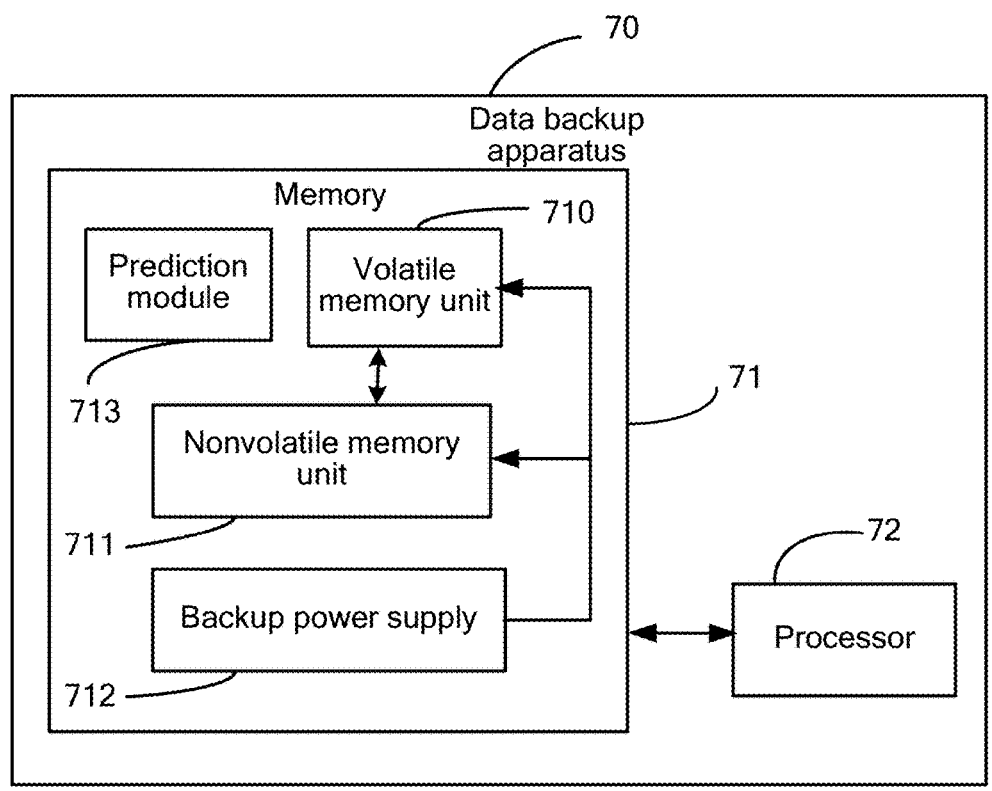
FIG. 7 is a structural diagram of a data backup apparatus provided in Embodiment 3 of the present disclosure.

Embodiment 3 provides a data backup apparatus 70. As shown in FIG. 7, the data backup apparatus 70 includes a memory 71 and a processor 72. The processor 72 controls access to data in the memory 71. The memory 71 includes a volatile memory unit 710, a nonvolatile memory unit 711, a backup power supply 712, and a prediction module 713. After the data backup apparatus 70 is powered on, data backed up in the nonvolatile memory unit 711 is recovered. After the data backup apparatus 70 is powered off, the backup power supply 712 is started to power the memory 70. The prediction module 713 is configured to predict a dead block in the volatile memory unit 710.

The volatile memory unit 710 is of a same structure as the volatile memory unit 310 in Embodiment 1, and details are not described herein again.

Figure 8:
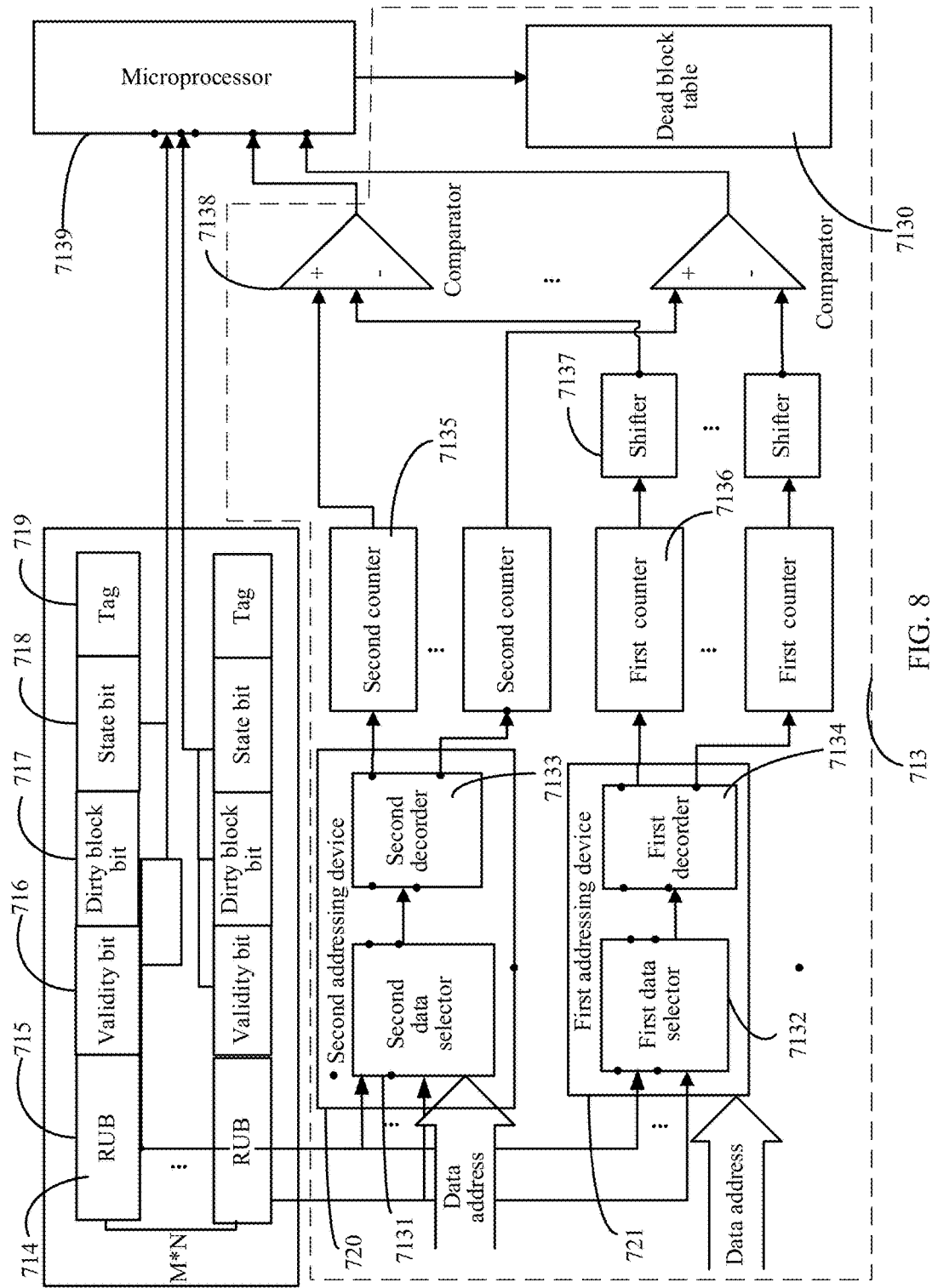
FIG. 8 is a structural diagram of a prediction module of the data backup apparatus provided in Embodiment 3 of the present disclosure.

As shown in FIG. 8, each cache block 714 includes an RUB 715, a validity bit 716, a dirty block bit 717, a state bit 718, and a tag 719. The RUB 715 is used to store an access sequence identifier. The validity bit 716 is used to store a validity identifier of the cache block. The dirty block bit 717 is used to store a dirty block identifier, and the state bit 718 is used to store a state identifier. The tag 719 is a tag of a cache block. When there is a data access request, a corresponding cache block 714 may be found by matching a data address in the access request with the tag.

The prediction module 713 is connected to the volatile memory unit 710 and is configured to predict a dead block in the volatile memory unit 710. The prediction module 713 includes a first addressing device 721 and a second addressing device 720. Input ends of the first addressing device 721 and the second addressing device 720 are both connected to each cache block 714.

The prediction module 713 further includes a counting unit (not shown in the figure). The counting unit includes N counter groups (not shown in the figure). The N counter groups have a one-to-one correspondence with the N access sequence identifiers. Each counter group includes one first counter 7136 and one second counter 7135. An input end of the first counter 7136 is connected to an output end of the first addressing device 721, and an input end of the second counter 7135 is connected to an output end of the second addressing device 720.

After the data backup apparatus 70 is powered on, the processor 72 recovers data backed up in the nonvolatile memory unit 711 to the volatile memory unit 710. The processor 72 obtains an initial access sequence identifier that is of each cache block 714 in each cache block set and that is at a time point $T_0$, and records the initial access sequence identifier to a recently used bit (RUB) of the cache block 714. The processor 72 sets a state bit of each cache block 714 in the volatile memory unit 710 to invalid. The time point $T_0$ is a time point at which the data backup apparatus 70 is powered on. The processor 72 further performs a data operation on the volatile memory unit. When determining that a state identifier of a cache block 714 corresponding to the current data operation is that the cache block is not sampled and that the cache block 714 corresponding to the data operation is accessed, the processor 72 determines that the cache block 714 corresponding to the current data operation is in a live state. Then, the processor controls the first addressing device 721 to find the corresponding cache block 714 according to an address of the cache block 714 corresponding to the current data operation. The processor 72 obtains an access sequence identifier of the found cache block 714 at the time point $T_0$, and obtains, according to the obtained access sequence identifier at the time point $T_0$, a first counter 7136 corresponding to the sequence access identifier, and performs counting on the first counter 7136. The processor 72 changes the state identifier of the cache block 714 to that the cache block is sampled. Alternatively, when determining that a state identifier of a cache block 714 corresponding to the current data operation is that the cache block is not sampled and that the cache block 714 corresponding to the data operation is evicted, the processor 72 determines that the cache block 714 corresponding to the current data operation is in a dead state. The second addressing device 720 finds the corresponding cache block 714 according to an address of the cache block 714 corresponding to the current data operation, obtains an access sequence identifier of the found cache block 714 at the time point $T_0$, obtains, according to the obtained access sequence identifier at the time point $T_0$, a second counter 7135 corresponding to the sequence access identifier, and performs counting on the second counter 7135, and the processor 72 changes the state identifier of the cache block 714 to that the cache block is sampled.

The prediction module 713 further includes N shifters 7137 and N comparators 7138. The N shifters 7137 are respectively connected to output ends of first counters 7136. Each comparator 7138 of the N comparators 7138 has two input ends, which are respectively connected to an output end of a second counter 7135 in a counter group and an output end of a shifter 7137 connected to a first counter 7136 in the counter group.

After the data backup apparatus 70 is powered off, the microprocessor 7139 starts the backup power supply 712 to power the memory 71, each shifter 7137 shifts, according to a preset threshold, a first counter 7136 connected to the shifter, each comparator 7138 compares an input from a second counter 7135 connected to the comparator and an input from a shifter 7137 connected to the comparator, and the microprocessor 7139 predicts, according to an output result of a comparator 7138 corresponding to each access sequence identifier, whether each cache block 714 having an access sequence identifier corresponding to the comparator 7138 is in the live state or the dead state, and backs up data in a cache block 714 that is predicted to be in the live state to the nonvolatile memory unit 711.

In this embodiment, the first addressing device 721 includes a first data selector 7132 and a first decoder 7134, the second addressing device 720 includes a second data selector 7131 and a second decoder 7133, input ends of the first data selector 7132 and the second data selector 7131 are both connected to each cache block 714, input ends of the first decoder 7134 and the second decoder 7133 are respectively connected to output ends of the first data selector 7132 and the second data selector 7131, output ends of the first decoder 7134 and the second decoder 7133 are respectively connected to an input end of a first counter 7136 in each counter group and an input end of a second counter group 7135 in the counter group.

When the processor 72 determines that the cache block 714 corresponding to the current data operation is in the live state, the first data selector 7132 finds the corresponding cache block according to the address of the cache block 714 corresponding to the current data operation, and obtains the access sequence identifier of the found cache block 714 at the time point $T_0$, and the first decoder 7134 decodes the obtained access sequence identifier to obtain a first counter 7136 corresponding to the sequence access identifier.

When the processor 72 determines that the cache block 714 corresponding to the current data operation is in the dead state, the second data selector 7131 finds the corresponding cache block 714 according to the address of the cache block corresponding to the current data operation, and obtains the access sequence identifier of the found cache block at the time point $T_0$, and the second decoder decodes the obtained access sequence identifier at the time point $T_0$ to obtain a second counter 7135 corresponding to the sequence access identifier, and then performs counting on the second counter 7135.

Embodiment 4

Embodiment 4 provides a data backup method applied to a data backup apparatus. A structure of the data backup apparatus is the same as the structure of the data backup apparatus in Embodiment 1, and details are not described herein again.

The data backup method includes two portions. One portion is data statistic, and one portion is data backup. The data statistics is executed when the data backup apparatus is powered on, and the data backup is executed when the data backup apparatus is powered off.

Figure 9:
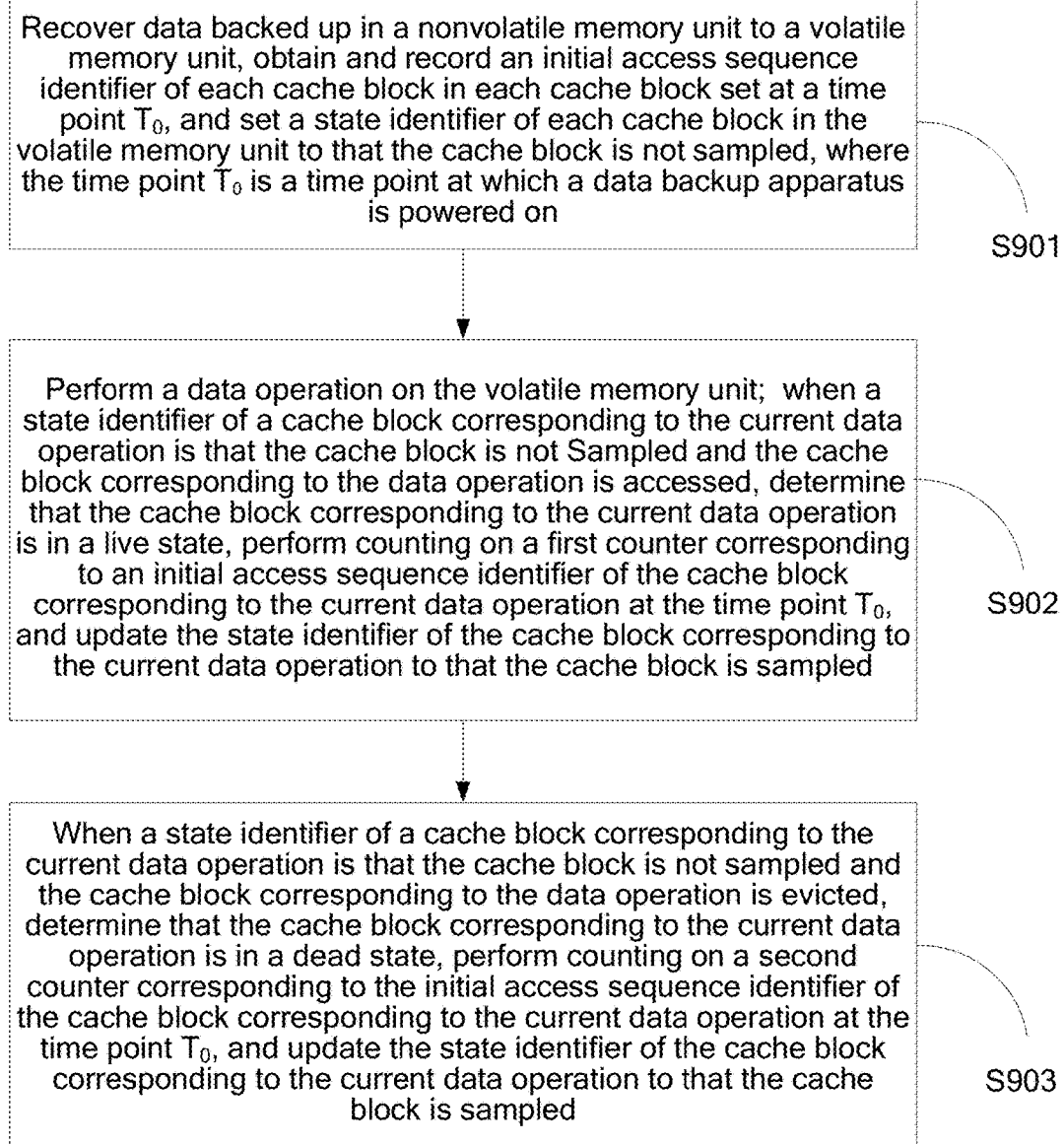
FIG. 9 is a flowchart of a method for data statistics according to a data backup method provided in Embodiment 4 of the present disclosure.

FIG. 9 is a flowchart of a data statistics executed when the data backup apparatus is powered on. The data statistics portion includes:

Step S901: Recover data backed up in the nonvolatile memory unit to the volatile memory unit, obtain and record an initial access sequence identifier of each cache block in each cache block set at a time point $T_0$, and set a state identifier of each cache block in the volatile memory unit to that the cache block is not sampled, where the time point $T_0$ is a time point at which the data backup apparatus is powered on.

Step S902: Perform a data operation on the volatile memory unit; when a state identifier of a cache block corresponding to the current data operation is that the cache block is not sampled and the cache block corresponding to the data operation is accessed, determine that the cache block corresponding to the current data operation is in a live state, perform counting on a first counter corresponding to the initial access sequence identifier of the cache block corresponding to the current data operation at the time point $T_0$, and update the state identifier of the cache block corresponding to the current data operation to that the cache block is sampled.

Step S903: When a state identifier of a cache block corresponding to the current data operation is that the cache block is not sampled and the cache block corresponding to the data operation is evicted, determine that the cache block corresponding to the current data operation is in a dead state, perform counting on a second counter corresponding to the initial access sequence identifier of the cache block corresponding to the current data operation at the time point $T_0$, and update the state identifier of the cache block corresponding to the current data operation to that the cache block is sampled.

Figure 10:
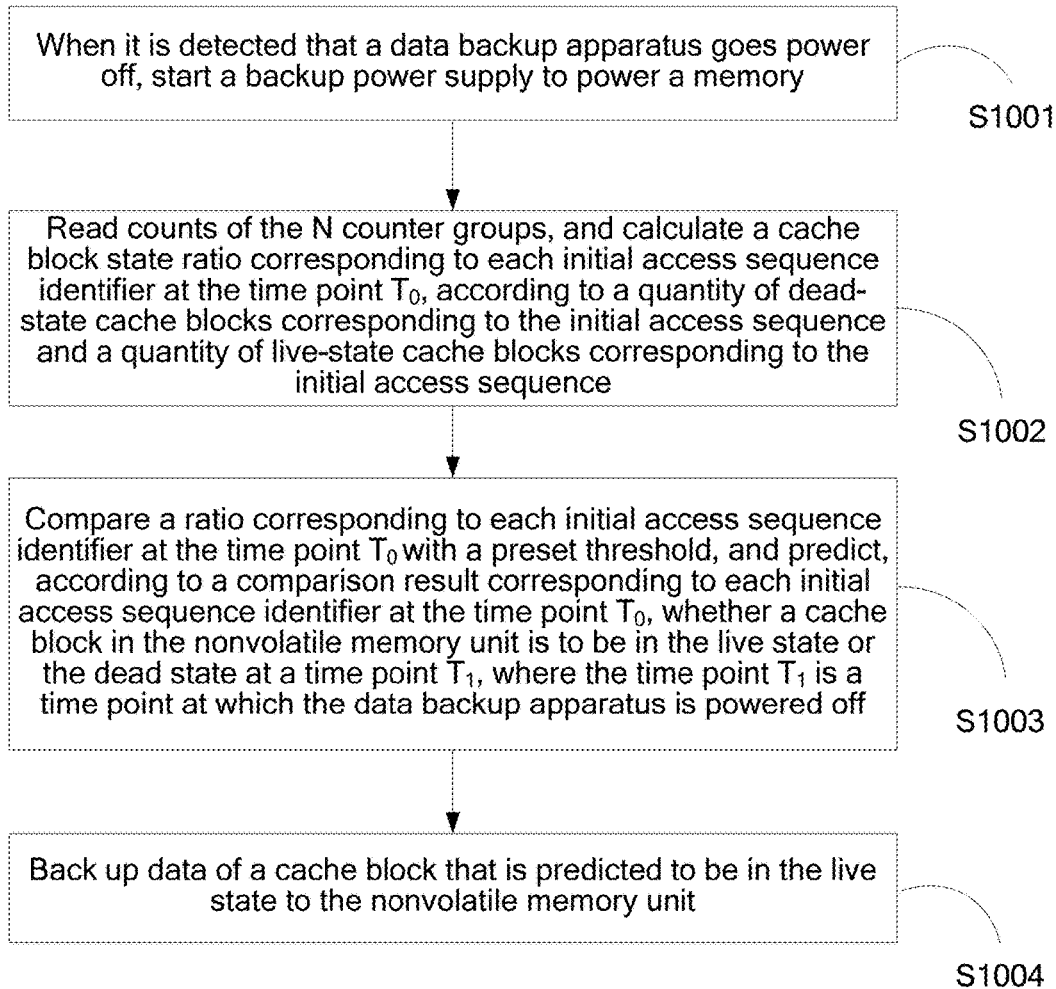
FIG. 10 is a flowchart of a method for backing up data according to the data backup method provided in Embodiment 4 of the present disclosure.

FIG. 10 is a flowchart of a data backup method executed when the data backup apparatus is powered off. The data backup method includes:

Step S1001: Start the backup power supply to power the memory.

Step S1002: Read counts of the N counter groups, and calculate a cache block state ratio corresponding to each initial access sequence identifier at the time point $T_0$, according to a quantity of dead cache blocks corresponding to the initial access sequence and a quantity of live cache blocks corresponding to the initial access sequence, where the cache block state ratio may be a ratio of dead blocks to live blocks, a proportion occupied by dead blocks, or a proportion occupied by live blocks.

Step S1003: Compare a ratio corresponding to each initial access sequence identifier at the time point $T_0$ with a preset threshold, and predict, according to a comparison result corresponding to each initial access sequence identifier at the time point $T_0$, whether a cache block in the nonvolatile memory unit is to be in the live state or the dead state at a time point $T_1$, where the time point $T_1$ is a time point at which the data backup apparatus is powered off.

Step S1004: Back up data of a cache block that is predicted to be in the live state to the nonvolatile memory unit.

Further, in the step S1003, the predicting, according to a comparison result corresponding to each initial access sequence identifier at the time point $T_0$, whether a cache block in the nonvolatile memory unit is to be in the live state or the dead state includes:

when a comparison result corresponding to a first access sequence identifier of the N initial access sequence identifiers that are at the time point $T_0$ is that a proportion occupied by dead blocks is not less than the preset threshold, predicting that a cache block having the access sequence identifier is to be in the dead state; or when a comparison result corresponding to a second access sequence identifier of the N initial access sequence identifiers that are at the time point $T_0$ is that a proportion occupied by dead blocks is less than the preset threshold, predicting that a cache block having the access sequence identifier is to be in the live state.

Further, each cache block further includes a valid block identifier and a dirty block identifier. The valid block identifier is used to identify whether a cache block is valid, and the dirty block identifier is used to identify whether a cache block is a dirty block;

after the predicting that a cache block having the access sequence identifier is to be in the dead state, among cache blocks that have the access sequence identifier and that are predicted to be in the dead state, that a cache block whose dirty block identifier is valid is to be in the live state is further determined; and after the predicting that a cache block having the access sequence identifier is to be in the live state, among cache blocks that have the access sequence identifier and that are predicted to be in the live state, that a cache block whose validity identifier is invalid is to be in the dead state is further determined.

Embodiment 5

Embodiment 5 provides a data backup method applied to a data backup apparatus. A structure of the data backup apparatus is the same as the structure of the data backup apparatus in Embodiment 2, and details are not described herein again.

The data backup method includes two portions. One portion is a data statistics method, and one portion is a data backup method. The data statistics method is executed when the data backup apparatus is powered on, and is the same as the data statistics method described in Embodiment 4. Details are not described herein again.

The data backup method is executed when the data backup apparatus is powered off.

Figure 11:
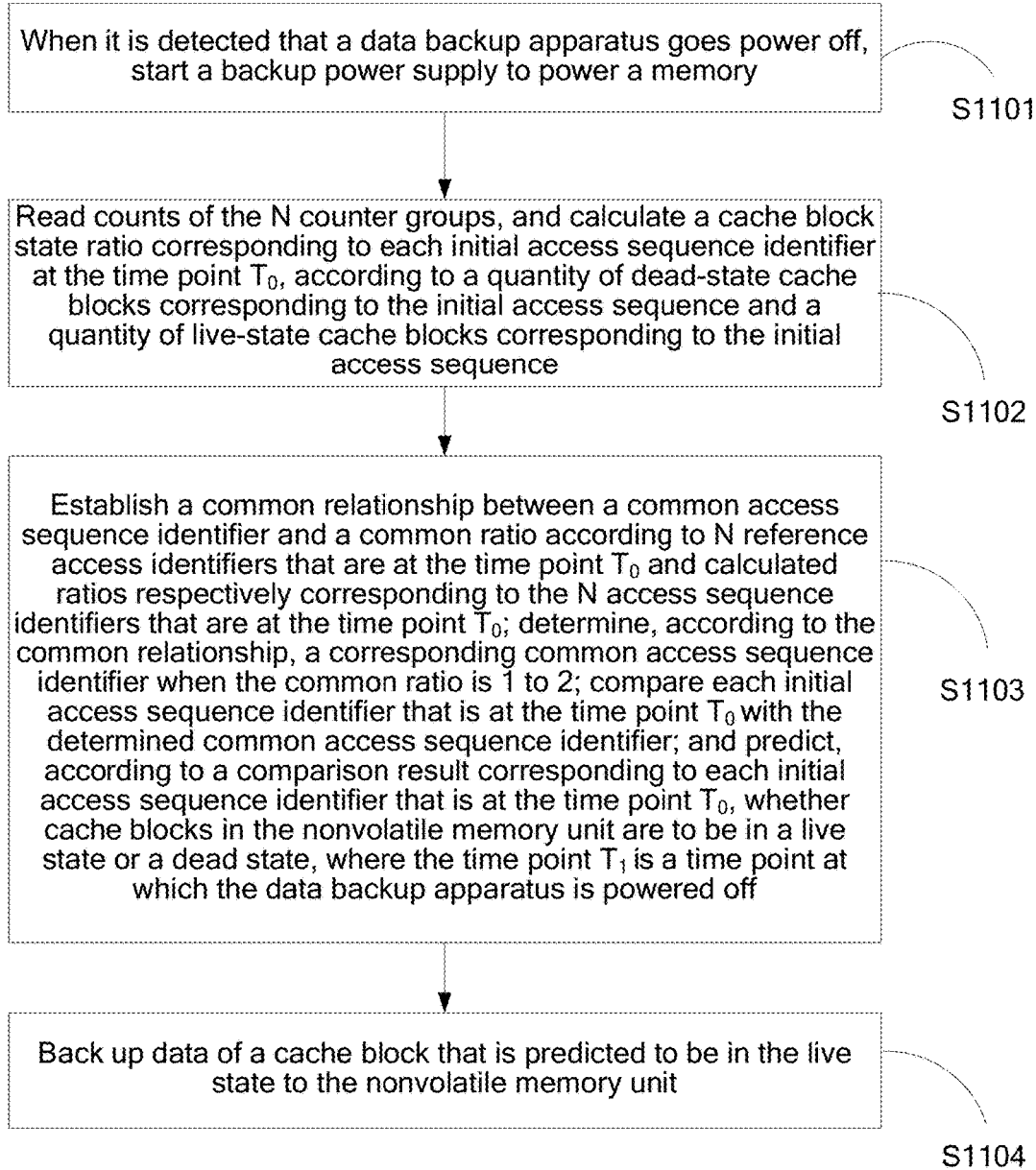
FIG. 11 is a flowchart of a method for backing up data according to a data backup method provided in Embodiment 5 of the present disclosure.

FIG. 11 is a flowchart of a data backup method executed when the data backup apparatus is powered off. Steps S1101, S1102, and S1104 in the data backup method in this embodiment are the same as steps S1001, S1002, and S1004 in the data backup method in Embodiment 4. A difference lies only in step S1103. In this embodiment, in step S1103, a common relationship between a common access sequence identifier and a common ratio is established according to N access sequence identifiers that are at the time point $T_0$ and calculated ratios respectively corresponding to the N access sequence identifiers that are at the time point $T_0$; and a corresponding common access sequence identifier TH when the common ratio is 1 to 2 (50%, that is, when the ratio is 50%, a total error is the lowest) is determined according to the common relationship. For the determining of the common relationship, refer to a related description in FIG. 6 in Embodiment 6, and details are not described herein again. Each initial access sequence identifier at the time point $T_0$ is compared with the common access sequence identifier TH; then, whether a cache block in the nonvolatile memory unit is to be in a live state or a dead state at a time point $T_1$ is predicted according to a comparison result corresponding to each initial access sequence identifier at the time point $T_0$, where the time point $T_1$ is a time point when the data backup apparatus is powered off. Specifically, when a first access sequence identifier of the access sequence identifiers is not less than the common access sequence identifier TH, the microprocessor predicts that a cache block having the first access sequence identifier is to be in the dead state; and when a second access sequence identifier of the initial access sequence identifiers is less than the common access sequence identifier TH, the microprocessor predicts that a cache block having the second access sequence identifier is to be in the live state. Other parts are the same as those in Embodiment 4, and details are not described herein again. A person of ordinary skill in the art may understand that all or some of the steps of the methods in the embodiments may be implemented by a program instructing relevant hardware. The program may be stored in a computer readable storage medium. The storage medium may include: a ROM, a RAM, a magnetic disk, or an optical disc.

The data backup apparatus and method provided in the embodiments of the present disclosure have been described in detail. The principle and implementation manners of the present disclosure are described herein by using specific examples. The description about the foregoing embodiments is merely provided to help understand the method and the core idea of the present disclosure. In addition, persons of ordinary skill in the art can make variations to the specific implementation manners and application scope based on the idea of the present disclosure. Therefore, the content of this specification shall not be construed as limitations on the present disclosure.

What is claimed is:

1. A data backup apparatus, comprising a memory and a processor,
   wherein the memory comprises a volatile memory unit, a nonvolatile memory unit, a microprocessor, and a backup power supply;
   wherein the volatile memory unit comprises M cache block sets, each cache block set comprises N cache blocks, M and N are integers, M≥1, N>1;
   wherein each cache block in a cache block set is marked with a different access sequence identifier, so as to indicate a sequence order according to which the cache blocks in the cache block set are accessed;
   wherein cache blocks having a same sequence order in all the M cache block sets are marked with a same access sequence identifier;
   wherein after the data backup apparatus is powered on at a time point $T_0$, the processor is configured to:
   recover data backed up in the nonvolatile memory unit to the volatile memory unit, wherein each cache block in the volatile memory unit is marked with an initial access sequence identifier that is same as the access sequence identifier at the time of a previous power off;
   when a cache block is accessed for the first time after the power-on and data recovery, determine that the cache block is a live cache block, and count the number of live cache blocks in the volatile memory unit that have an initial access sequence identifier the same as that of the accessed cache block at the time point $T_0$; and
   when a cache block is evicted for the first time after the power-on and data recovery, determine that the cache block is a dead cache block, and count the number of dead cache blocks in the volatile memory unit that have an initial access sequence identifier the same as that of the evicted cache block at the time point $T_0$;
   wherein after the data backup apparatus is powered off at a time point $T_1$ which is later than $T_0$, the microprocessor in the memory is configured to:
   turn on the backup power supply to power the memory;
   for each initial access sequence identifier at the time point $T_0$, calculate a ratio between quantity of the live cache blocks and quantity of the dead cache blocks;
   compare each ratio with a preset threshold;
   predict, according to a comparison result of each ratio, whether a cache block in the nonvolatile memory unit is a live cache block or a dead cache block at the time point $T_1$; and
   back up data stored in a cache block that is predicted to be the live cache block to the nonvolatile memory unit.

2. The data backup apparatus according to claim 1, wherein each cache block is further marked with a status identifier, wherein when the data backed up in the nonvolatile memory unit is recovered to the volatile memory unit, the status identifier of each cache block is set as unsampled, and when a cache block is accessed or evicted for the first time after the power-on, the status identifier of the cache block is set as sampled.

3. The data backup apparatus according to claim 1, wherein in predicting whether a cache block in the nonvolatile memory unit is a live cache block or a dead cache block at the time point $T_1$, the microprocessor is configured to:
   when a comparison result corresponding to an access sequence identifier of the N initial access sequence identifiers that are at the time point $T_0$ is not less than the preset threshold, predict that all cache blocks having the same access sequence identifier are dead cache blocks; and
   when a comparison result corresponding to an access sequence identifier of the N initial access sequence identifiers that are at the time point $T_0$ is less than the preset threshold, predict that all cache blocks having the same access sequence identifier are live cache blocks.

4. The data backup apparatus according to claim 3, wherein each cache block is further marked with a validity identifier, and a cache block is either a valid cache block or a invalid cache block;
   wherein after predicting that a cache block is a dead cache block according to the comparison result, the microprocessor further determines that, if a predicted dead cache block is a valid block, it is a live cache block; and
   wherein after predicting that a cache block is a live cache block according to the comparison result, the microprocessor further determines that, if a predicted live cache block is a invalid block, it is a dead cache block.

5. The data backup apparatus according to claim 1, wherein in backing up data of a cache block that is predicted to be the live cache block to the nonvolatile memory unit, the microprocessor is configured to:
   record information about cache blocks that are predicted to be the dead cache blocks to a dead cache block recording table;
   determine whether a current cache block is a predicted dead cache block or live cache block; and
   when the current cache block is a predicted live cache block, back up data stored in the current cache block to the nonvolatile memory unit, or when the current cache block is a predicted dead cache block, skip backing up data stored in the current cache block.

6. The data backup apparatus according to claim 4, wherein the preset threshold is 0.5.

7. A data backup method for use by a data backup apparatus, wherein the data backup apparatus comprises a memory and a processor, and the memory comprises a volatile memory unit, a nonvolatile memory unit, a microprocessor and a backup power supply;

wherein the volatile memory unit comprises M cache block sets, each cache block set comprises N cache blocks, M and N are integers, M≥1, N>1;
wherein the method comprises:
marking each cache block in a cache block set with a different access sequence identifier, so as to indicate a sequence order according to which the cache blocks are accessed, wherein cache blocks on a same sequence order in all the M cache block sets are marked with a same access sequence identifier; and
updating a sequence order of cache blocks in a cache block set after one of the cache blocks in the cache block set is accessed;
after the data backup apparatus is powered on at a time point $T_0$, recovering data backed up in the nonvolatile memory unit to the volatile memory unit, wherein each cache block is marked with an access sequence identifier that is same as the access sequence identifier at the time of a previous power off;
when a cache block is accessed for the first time after the power-on and data recovery, determining that the cache block is a live cache block, and counting the number of live cache blocks in the volatile memory unit that have an initial access sequence identifier the same as that of the accessed cache block at the time point $T_0$; and
when a cache block is evicted for the first time after the power-on and data recovery, determining that the cache block is a dead cache block, and counting the number of dead cache blocks in the volatile memory unit that have an initial access sequence identifier the same as that of the evicted cache block corresponding to the current data operation at the time point $T_0$;
after the data backup apparatus is powered off at a time point $T_1$ which is later than $T_0$, turning on the backup power supply to power the memory;
for each initial access sequence identifier at the time point $T_0$, calculating a ratio between quantity of the live cache blocks and quantity of the dead cache blocks;
comparing each ratio with a preset threshold;
predicting, according to a comparison result of each ratio, whether a cache block in the nonvolatile memory unit is a live cache block or dead cache block at the time point $T_1$; and
backing up data stored in a cache block that is predicted to be in the live cache block to the nonvolatile memory unit.

8. The method according to claim 7, wherein each cache block is further marked with a status identifier, the method further comprising:
when the data backed up in the nonvolatile memory unit is recovered to the volatile memory unit, setting the status identifier of each cache block as unsampled; and
when a cache block is accessed or evicted for the first time after the power-on, setting the status identifier of the cache block as sampled.

9. The method according to claim 7, wherein predicting whether a cache block in the nonvolatile memory unit is a live cache block or a dead cache block at a time point $T_1$ comprises:
when a comparison result corresponding to an access sequence identifier of the N initial access sequence identifiers that are at the time point $T_0$ is not less than a preset threshold, predicting that all cache blocks having the same access sequence identifier are dead cache blocks; and
when a comparison result corresponding to an access sequence identifier of the N initial access sequence identifiers that are at the time point $T_0$ is less than the preset threshold, predicting that all cache blocks having the same access sequence identifier are live cache blocks.

10. The method according to claim 9, wherein each cache block is further marked with a validity identifier, and a cache block is either a valid block or a invalid block; and wherein the method further comprises:
after predicting that a cache block is a dead cache block according to the comparison result, determining, if a predicted dead cache block is a valid block, it is a live cache block; and
after predicting that a cache block is a live cache block according to the comparison result, determining, if a predicted live cache block is a invalid block, it is a dead cache block.

11. The method according to claim 7, wherein backing up data of a cache block that is predicted to be the live cache block to the nonvolatile memory unit comprises:
recording information about cache blocks that are predicted to be the dead cache blocks to a dead cache block recording table;
determining whether a current cache block is a predicted dead cache block or live cache block; and
when the current cache block is a predicted live cache block, backing up data stored in the current cache block to the nonvolatile memory unit; or
when the current cache block is a predicted dead cache block, skipping backing up data in the cache block.

12. The method according to claim 10, wherein the preset threshold is 0.5.

13. A data backup apparatus, comprising a memory and a processor,
wherein the memory comprises a volatile memory unit, a nonvolatile memory unit, a microprocessor, and a backup power supply;
wherein the volatile memory unit comprises M cache block sets, each cache block set comprises N cache blocks, M and N are integers, M≥1, N>1;
wherein each cache block in a cache lock set is marked with a different access sequence identifier, so as to indicate a sequence order according to which the cache blocks in the cache block set are accessed;
wherein cache blocks on a same sequence order in all the M cache block sets are marked with a same access sequence identifier;
wherein a sequence order of cache blocks in a cache block set is updated after one of the cache blocks in the cache block set is accessed;
wherein after the data backup apparatus is powered on at a time point $T_0$, the processor is configured to:
recover data backed up in the nonvolatile memory unit to the volatile memory unit, wherein each cache block is marked with an initial access sequence identifier that is same as the access sequence identifier at the time of a previous power off;
when a cache block is accessed for the first time after the power-on and data recovery, determine that the cache block is a live cache block, and count the number of live cache blocks in the volatile memory unit that have an initial access sequence identifier the same as that of the accessed cache block at the time point $T_0$; and
when a cache block is evicted for the first time after the power-on and data recovery, determine that the cache block is a dead cache block, and count the number of dead cache blocks in the volatile memory unit that have an initial access sequence identifier the same as that of the evicted cache block at the time point $T_0$;

wherein after the data backup apparatus is powered off at a time point $T_1$ which is later than $T_0$, the microprocessor is configured to:

turn on the backup power supply to power the memory;

for each initial access sequence identifier at the time point $T_0$, calculate a ratio between quantity of the live cache blocks and quantity of the dead cache blocks;

establish a common relationship between a common access sequence identifier and a common ratio according to the N initial access sequence identifiers at the time point $T_0$ and the calculated ratios respectively corresponding to the N initial access sequence identifiers at the time point $T_0$;

determine, according to the common relationship, a corresponding common access sequence identifier for a common ratio of 1 to 2;

compare each initial access sequence identifier at the time point $T_0$ with the determined common access sequence identifier;

predict, according to a comparison result of each initial access sequence identifier, whether a cache block in the nonvolatile memory unit is a live cache block or a dead cache block at the time point $T_1$; and back up data stored in a cache block that is predicted to be the live cache block to the nonvolatile memory unit.

14. The data backup apparatus according to claim 13, wherein each cache block is further marked with a status identifier, wherein when the data backed up in the nonvolatile memory unit is recovered to the volatile memory unit, the status identifier of each cache block is set as unsampled, and when a cache block is accessed or evicted for the first time after the power-on and data recovery, the status identifier of the cache block is set as sampled.

15. The data backup apparatus according to claim 13, wherein in predicting whether a cache block in the nonvolatile memory unit is a live cache block or a dead cache block at the time point $T_1$, the microprocessor is configured to:

when an access sequence identifier at the time point $T_0$ is not less than the determined common access sequence identifier, predict that all cache blocks having the same access sequence identifier are dead cache blocks; and when an access sequence identifier at the time point $T_0$ is less than the determined common access sequence identifier, predict that all cache blocks having the same access sequence identifier are live cache blocks.

16. The data backup apparatus according to claim 15, wherein each cache block is further marked with a validity identifier, and a cache block is either a valid cache block or a invalid cache block;

wherein after predicting that a cache block is a dead cache block according to the comparison result, the microprocessor further determines that, if the predicted dead cache block is a valid block, it is a live cache block; and wherein after predicting that a cache block is a live cache block according to the comparison result, the microprocessor further determines that, if the predicted live cache block is a invalid block, it is a dead cache block.

17. The data backup apparatus according to claim 13, wherein in backing up data of a cache block that is predicted to be the live cache block to the nonvolatile memory unit, the microprocessor is configured to:

recording information about cache blocks that are predicted to be in the dead cache blocks to a dead cache block recording table;

determine whether a current cache block is a predicted dead cache block or live cache block; and when the current cache block is a predicted live cache block, backing up data stored in the current cache block to the nonvolatile memory unit; or when the current cache block is a predicted dead cache block, skip backing up data stored in the current cache block.

18. A data backup method for use by a data backup apparatus, wherein the data backup apparatus comprises a memory and a processor, and the memory comprises a volatile memory unit, a nonvolatile memory unit, a microprocessor and a backup power supply;

wherein the volatile memory unit comprises M cache block sets, each cache block set comprises N cache blocks, M and N are integers, M≥1, N>1, wherein the method comprises:

marking each cache block in a cache block set with a different access sequence identifier, so as to indicate a sequence order according to which the cache blocks are accessed, wherein cache blocks on a same sequence order in all the M cache block sets are marked with a same access sequence identifier; and updating a sequence order of cache blocks in a cache block set after one of the cache blocks in the cache block set is accessed;

after the data backup apparatus is powered on at a time point $T_0$, recovering data backed up in the nonvolatile memory unit to the volatile memory unit, wherein each cache block is marked with an access sequence identifier that is same as the access sequence identifier at the time of a previous power off;

when a cache block is accessed for the first time after the power-on and data recovery, determining that the cache block is a live cache block, and counting the number of live cache blocks in the volatile memory unit that have an initial access sequence identifier the same as that of the accessed cache block at the time point $T_0$; and when a cache block is evicted for the first time after the power-on and data recovery, determining that the cache block is a dead cache block, and counting the number of dead cache blocks in the volatile memory unit that have an initial access sequence identifier the same as that of the evicted cache block corresponding to the current data operation at the time point $T_0$;

after the data backup apparatus is powered off at a time point $T_1$ which is later than $T_0$, turning on the backup power supply to power the memory;

for each initial access sequence identifier at the time point $T_0$, calculating a ratio between quantity of the live cache blocks and quantity of the dead cache blocks;

establishing a common relationship between a common access sequence identifier and a common ratio according to the N initial access sequence identifiers at the time point $T_0$ and the calculated ratios respectively corresponding to the N initial access sequence identifiers at the time point $T_0$;

determining, according to the common relationship, a corresponding common access sequence identifier for a common ratio of 1 to 2;

comparing each initial access sequence identifier at the time point $T_0$ with the determined common access sequence identifier;

predicting, according to a comparison result of each initial access sequence identifier, whether a cache block in the nonvolatile memory unit is a live cache block or a dead cache block state at a time point $T_1$; and backing up data stored in a cache block that is predicted to be the live cache block to the nonvolatile memory unit.

19. The data backup method according to claim 18, wherein each cache block is further marked with a status identifier, wherein when the data backed up in the nonvolatile memory unit is recovered to the volatile memory unit, the status identifier of each cache block is set as unsampled, and when a cache block is accessed or evicted for the first time after the power-on and data recovery, the status identifier of the cache block is set as sampled.

20. The data backup method according to claim 18, wherein predicting whether a cache block in the nonvolatile memory unit is a live cache block or a dead cache block at a time point $T_1$ comprises:
when an access sequence identifier at the time point $T_0$ is not less than the determined common access sequence identifier, predicting that all cache blocks having the same access sequence identifier are dead cache blocks; and
when an access sequence identifier at the time point $T_0$ is less than the determined common access sequence identifier, predicting that all cache blocks having the same access sequence identifier are live cache blocks.

21. The data backup method according to claim 20, wherein each cache block is further marked with a validity identifier, and a cache block is either a valid cache block or a invalid cache block, and wherein the method further comprises:
after predicting that the cache block is a dead cache block according to the comparison result, determining, if the predicted dead cache block is a valid block, it is a live cache block;
after predicting that the cache block is a live cache block according to the comparison result, determining, if the predicted live cache block is a invalid block, it is a dead cache block.

22. The data backup method according to claim 18, wherein backing up data of a cache block that is predicted to be the live cache block to the nonvolatile memory unit comprises:
recording information about cache blocks that are predicted to be the dead cache blocks to a dead cache block recording table;
determining whether a current cache block is a predicted dead cache block or live cache block; and
when the current cache block is a predicted live cache block, backing up data stored in the current cache block; or
when the current cache block is a predicted dead cache block, skipping backing up data stored in the current cache block.

23. A data backup apparatus, comprising a memory and a processor, wherein the memory comprises a volatile memory unit, a nonvolatile memory unit, a microprocessor, and a backup power supply;
wherein the volatile memory unit comprises M cache block sets, each cache block set comprises N cache blocks, M and N are integers, M≥1, N>1;
wherein each cache block in a cache block set is marked with a different sequence identifier, so as to indicate a sequence order according to which the cache blocks in the cache block set are accessed;
wherein cache blocks on a same access sequence in all the M cache block sets are marked with a same access sequence identifier;
wherein a sequence order of cache blocks in a cache block set is updated after one of the cache blocks in the cache block set is accessed;
wherein the memory further comprises:
a first addressing device and a second addressing device, wherein both an input end of the first addressing device and an input end of the second addressing device are connected to each cache block; and
a counting unit, wherein the counting unit comprises N counter groups, the N counter groups are in a one-to-one correspondence with the N access sequence identifiers, each counter group comprises one first counter and one second counter, an input end of the first counter is connected to an output end of the first addressing device, and an input end of the second counter is connected to an output end of the second addressing device;
wherein after the data backup apparatus is powered on at a time point $T_0$, the processor is configured to:
recover data backed up in the nonvolatile memory unit to the volatile memory unit;
obtain an initial access sequence identifier of each cache block in each cache block set at a time point $T_0$, record the initial access sequence identifier to a recently used bit (RUB) of the cache block, and set a state bit of each cache block in the volatile memory unit to invalid;
when a cache block is accessed for the first time after the power-on and data recovery, determine that the cache block is a live cache block;
control the first addressing device to find the cache block according to an address of the cache block;
obtain an access sequence identifier of the found cache block at the time point $T_0$;
obtain, according to the obtained access sequence identifier at the time point $T_0$, a first counter corresponding to the sequence access identifier at the time point $T_0$;
count the first counter;
when a cache block is evicted for the first time after the power-on and data recovery, determine that the cache block is a dead cache block;
control the second addressing device to find the cache block according to an address of the cache block;
obtain an access sequence identifier of the found cache block at the time point $T_0$;
obtain, according to the obtained access sequence identifier at the time point $T_0$, a second counter corresponding to the sequence access identifier at the time point $T_0$,
and count the second counter;
wherein the memory further comprises:
N shifters, respectively connected to output ends of first counters in the N counter groups; and
N comparators, wherein each comparator has two input ends, which are respectively connected to an output end of a second counter in a counter group and an output end of a shifter connected to a first counter in the counter group;
wherein after the data backup apparatus is powered off at a time point $T_1$, the microprocessor is configured to turn on the backup power supply to power the memory;
wherein each shifter shifts, according to a preset threshold, a first counter connected to the shifter;
each comparator compares an input from a second counter connected to the comparator and an input from a shifter connected to the comparator;
and wherein the microprocessor is further configured to:

predict, according to an output result of a comparator corresponding to each access sequence identifier, whether each cache block in the nonvolatile memory unit is a live cache block or a dead cache block at a time point $T_1$, and backs up data stored in a cache block that is predicted to be the live cache block to the nonvolatile memory unit.

24. The data backup apparatus according to claim 23, wherein the first addressing device comprises a first data selector and a first decoder, the second addressing device comprises a second data selector and a second decoder, input ends of the first data selector and the second selection unit are both connected to each cache block, input ends of the first decoder and the second decoder are respectively connected to output ends of the first data selector and the second data selector, output ends of the first decoder and the second decoder are respectively connected to an input end of a first counter and a second counter group in each counter group;

when the processor determines that the cache block is a live cache block, the first data selector finds the cache block according to the address of the cache block, and obtains the access sequence identifier of the found cache block at the time point $T_0$, and the first decoder decodes the obtained access sequence identifier to obtain a first counter corresponding to the sequence access identifier; and when the processor determines that the cache block is a dead cache block, the second data selector finds the cache block according to the address of the cache block, and obtains the access sequence identifier of the found cache block at the time point $T_0$, and the second decoder decodes the obtained access sequence identifier at the time point $T_0$ to obtain a second counter.

* * * * *